US012574993B2

(12) United States Patent
Zhang et al.

(10) Patent No.: US 12,574,993 B2

(45) Date of Patent: Mar. 10, 2026

(54) MULTIPLE DRX CONFIGURATIONS FOR D2D COMMUNICATION

(71) Applicant: Telefonaktiebolaget LM Ericsson (publ), Stockholm (SE)

(72) Inventors: Congchi Zhang, Shanghai (CN); Ricardo Blasco Serrano, Espoo (FI); Hieu Do, Järfälla (SE); Zhang Zhang, Beijing (CN); Antonino Orsino, Kirkkonummi (FI); Shehzad Ali Ashraf, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 408 days.

(21) Appl. No.: 18/017,944

(22) PCT Filed: Jul. 29, 2021

(86) PCT No.: PCT/EP2021/071263

§ 371 (c)(1),
(2) Date: Jan. 25, 2023

(87) PCT Pub. No.: WO2022/023471

PCT Pub. Date: Feb. 3, 2022

(65) Prior Publication Data

US 2023/0284332 A1 Sep. 7, 2023

(30) Foreign Application Priority Data

Jul. 31, 2020 (WO) ................ PCT/CN2020/106266

(51) Int. Cl.
*H04W 76/28* (2018.01)
*H04W 76/23* (2018.01)

(52) U.S. Cl.
CPC .......... *H04W 76/28* (2018.02); *H04W 76/23* (2018.02)

(58) Field of Classification Search
CPC ....... H04W 4/40; H04W 76/14; H04W 76/23; H04W 76/28
See application file for complete search history.

(56) References Cited

U.S. PATENT DOCUMENTS

2013/0215809 A1* 8/2013 Chang .................. H04W 76/28 370/311
2013/0301501 A1* 11/2013 Olvera-Hernandez ..................... H04W 52/0216 370/311

(Continued)

FOREIGN PATENT DOCUMENTS

CN 114830806 A 7/2022
CN 115443694 A 12/2022

(Continued)

OTHER PUBLICATIONS

3GPP, "3GPP TS 38.321 V16.0.0", 3rd Generation Partnership Project; Technical Specification Group Radio Access Network; NR; Medium Access Control (MAC) protocol specification (Release 16), Mar. 2020, 1-141.

(Continued)

*Primary Examiner* — Kashif Siddiqui

(74) *Attorney, Agent, or Firm* — Murphy, Bilak & Homiller, PLLC

(57) ABSTRACT

A wireless communication device (10) simultaneously maintains a first DRX configuration for D2D communication and a second DRX configuration for D2D communication. Based on at least one of the first DRX configuration and the second DRX configuration, the wireless communication device (10) participates in D2D communication with one or more further wireless communication devices (10).

26 Claims, 11 Drawing Sheets

(56) References Cited

U.S. PATENT DOCUMENTS

| | | | | |
|---|---|---|---|---|
| 2014/0003316 | A1* | 1/2014 | Yu | H04W 76/28 370/311 |
| 2016/0219443 | A1* | 7/2016 | Lee | H04W 74/006 |
| 2020/0245395 | A1 | 7/2020 | Zhang et al. | |
| 2022/0256625 | A1* | 8/2022 | Park | H04W 76/14 |
| 2022/0312326 | A1* | 9/2022 | Wu | H04W 76/28 |
| 2022/0353815 | A1* | 11/2022 | Lin | H04W 52/0232 |
| 2023/0180343 | A1* | 6/2023 | Park | H04W 76/14 |
| 2024/0214940 | A1* | 6/2024 | Zhang | H04W 52/0229 |

FOREIGN PATENT DOCUMENTS

| | | | |
|---|---|---|---|
| WO | 2014092612 | A1 | 6/2014 |
| WO | 2017078783 | A1 | 5/2017 |
| WO | 2018016882 | A1 | 1/2018 |
| WO | 2018064477 | A1 | 4/2018 |
| WO | 2020057717 | A1 | 3/2020 |
| WO | 2021002723 | A1 | 1/2021 |
| WO | 2021119474 | A1 | 6/2021 |
| WO | 2021127866 | A1 | 7/2021 |
| WO | 2021163527 | A1 | 8/2021 |

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.8.0, Dec. 2019, 1-78.

3GPP, "3rd Generation Partnership Project; Technical Specification Group Radio Access Network; NR; Study on NR Vehicle-to-Everything (V2X) (Release 16)", 3GPP TR 38.885 V16.0.0, Mar. 2019, 1-122.

Ericsson, "DRX for sidelink communications", 3GPP TSG-RAN WG2 Meeting #112-e, R2-2009231, e-Meeting, Nov. 2-13, 2020, 1-6.

LG Electronics, "New WID on NR sidelink enhancement", 3GPP TSG RAN Meeting #86, RP-193231, (revision of RP-193134), Sitges, Spain, Dec. 9-12, 2019, 1-6.

LG Electronics, "Wid revision: NR sidelink enhancement", 3GPP TSG RAN Meeting #88e, RP-201385, (revision of RP-201283), Electronic Meeting, Jun. 29-Jul. 3, 2020, 1-6.

"Sidelink maintenance for evolved L2 relay", 3GPP TSG-RAN WG2#98, R2-1705126, Hangzhou, China, May 15-19, 2017, 1-4.

LG Electronics, "Summary of email discussion on Rel-17 sidelink enhancement", 3GPP TSG RAN #86, RP-192745, Sitges, ES, Dec. 9-12, 2019, 1-27.

Lenovo, et al., "DRX Configuration for Broadcast and Groupcast SL communication", 3GPP TSG-RAN WG2 Meeting #113bis electronic, R2-2103741, Online, Apr. 12-Apr. 20, 2021, 1-5.

Oppo, "Discussion on configuration and parameter for sidelink DRX", 3GPP TSG-RAN WG2 #113-e, R2-2100273, E-meeting, Jan. 2021, 1-8.

* cited by examiner

810 — Module 1:
Receive/send configuration information

820 — Module 2:
Maintaining DRX configurations

830 — Module 3:
Enabling/disabling DRX configurations

840 — Module 4:
Participating in D2D communication

800

WIRELESS COMMUNICATION DEVICE

MULTIPLE DRX CONFIGURATIONS FOR D2D COMMUNICATION

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP ($3^{rd}$ Generation Partnership Project), also support D2D communication modes to enable direct communication between UEs (user equipments), sometimes also referred to as sidelink communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019-03). In the NR technology, also more targeted V2X services are considered, by supporting also groupcast, multicast, or unicast transmissions, in which the intended receiver of a message consists of only a subset of the receivers within a certain range of the transmitter (groupcast) or of a single receiver (unicast).

For example, in a platooning service for vehicles there may be certain messages that are only of interest for a member vehicle of the platoon, so that the member vehicles of the platoon can be efficiently targeted by a groupcast transmission. In another example, the see-through functionality, where one vehicle provides video data from a front facing camera to a following vehicle, may involve V2X communication of only a pair of vehicles, for which unicast transmissions may be a preferred choice. Furthermore, NR sidelink communication supports D2D communication of UEs with and without network coverage, with varying degrees of interaction between the UEs and the network, including the possibility of standalone, network-less operation.

Further potential use cases of D2D communication include NSPS (National Security and Public Safety), Network Controlled Interactive Service (NCIS), and Gap Analysis for Railways. In order to provide a wider coverage of NR sidelink for such use cases, it further enhancements of the NR sidelink technology are being considered. One of such enhancements is power saving which enables UEs with battery constraint to perform sidelink operations in a power efficient manner. For example, 3GPP work item description “NR Sidelink Enhancement”, document RP-193231, TSG RAN Meeting #86 (2019-12), suggests investigation of sidelink Discontinuous Reception (DRX) operation for broadcast, groupcast, and unicast transmission modes, aiming at definition of sidelink DRX configurations and procedures for implementing sidelink DRX in UEs, including mechanisms to align sidelink DRX configurations among the UEs communicating with each other, and mechanisms to align sidelink DRX configurations with DRX configurations for downlink (DL) and uplink (UL) communication via the Uu radio interface. However, appropriate mechanisms and procedures have not yet been developed.

For the NR technology, DRX procedures for DL/UL communication via the Uu radio interface are specified in 3GPP TS 38.321 V16.0.0 (2020-03). On the basis of these procedures, expected UE behavior in terms of reception and processing of transmissions can be controlled. The underlying DRX functionalities are based on defining a DRX active time, sometimes also referred to as active time state or ACTIVE state, in which the UE is expected to receive and process incoming transmissions. For example, the UE is expected to decode the DL control channels, process received grants etc. Outside the DRX active time, in what is also denoted as DRX inactive time, there is no expectation on the UE to receive and process transmissions. Accordingly, an access node, in the NR technology denoted as “gNB”, cannot assume that the UE will be listening to DL transmissions. A DRX configuration may also define transitions between states. Typically, UEs that are not in the DRX active time turn off some of their components and enter a low-power mode, e.g., a sleeping mode. To ensure that the UE regularly switches to the DRX active time, i.e., wakes up from the sleeping mode, a DRX cycle is defined. The DRX cycle may basically be based on two parameters: a periodicity of the DRX cycle, which controls how frequently the UE switches to the DRX active time, and a duration of the DRX active time, which controls for how long the UE is in the DRX active state. In addition to this basic DRX cycle, the DRX procedures also define other conditions that may allow the UE to switch between the DRX active time and the DRX inactive time. For example, if a UE is expecting a retransmission from the gNB, the UE may enter the DRX inactive time, e.g., while the gNB prepares the retransmission, and then may enter the DRX active time, which should match a time window in which the gNB is expected to send the retransmission. Typically, the DRX active time of the DRX cycle is determined by the DRX configuration. Accordingly, the DRX configuration typically allows to predict when the UE will be in the DRX active time. On the other hand, it might be much more difficult to predict whether a UE is in the DRX active time due various timers which depend on the data traffic received or sent by the UE. The DRX procedures specified in 3GPP TS 38.321 V16.0.0 apply to the DL/UL communication between the UE and the wireless communication network, and cannot be applied to SL communication or other types of D2D communication.

Further, SL transmissions differ in many aspects from DL and UL transmissions. For example, In DL/UL communication, an access node, e.g., a gNB, is one of the endpoints of communication and communication is typically organized in a one-to-one manner, i.e., between a certain UE and a certain access node. This simplifies the configuration of DRX at the UE. Moreover, the access node is not subject to the same power constraints as the UE, so that DRX is implemented at the UE, but not at the access node. SL communication is often based on using a broadcast transmission mode. Even the unicast and groupcast transmission modes of the NR SL technology use of broadcast communications to some extent, e.g., for discovery and connection establishment. The existing DRX procedures for DL/UL communication are however based on assuming that the communication is typically organized in a one-to-one manner, which allows the access node to distribute the load and thereby efficiently use all radio resources, which is not possible in the case of communication in broadcast mode. Further, in DL/UL communication, it is typically the access node which is responsible for controlling the behavior of the UE, while for SL communication many control functionalities are implemented in a distributed manner, e.g., distributed among transmitting (TX) UE, receiving (RX) UE, and sometimes also the serving access node(s) of the UEs. Accordingly, appropriate configuration of DRX for SL transmissions is much more complex than for DL/UL communication.

Accordingly, there is a need for techniques which allow for efficiently implementing DRX for sidelink transmissions and other types of D2D transmission.

SUMMARY

According to an embodiment, a method of controlling D2D communication is provided. According to the method, a wireless communication device simultaneously maintains a first DRX configuration for D2D communication and a second DRX configuration for D2D communication. Based on at least one of the first DRX configuration and the second DRX configuration, the wireless communication device participates in D2D communication with one or more further wireless communication devices.

According to a further embodiment, a method of controlling D2D communication is provided. According to the method, a node of a wireless communication network configures a wireless communication device to simultaneously maintain a first DRX configuration for D2D communication with one or more further wireless communication devices and a second DRX configuration for D2D communication with one or more further wireless communication devices.

According to a further embodiment, a wireless communication device is provided. The wireless communication device is configured to simultaneously maintain a first DRX configuration for D2D communication and a second DRX configuration for D2D communication. Further, the wireless communication device is configured to, based on at least one of the first DRX configuration and the second DRX configuration, participate in D2D communication with one or more further wireless communication devices.

According to a further embodiment, a wireless communication device is provided. The wireless communication device comprises at least one processor and a memory. The memory contains instructions executable by said at least one processor, whereby the wireless communication device is operative to simultaneously maintain a first DRX configuration for D2D communication and a second DRX configuration for D2D communication. Further, the memory contains instructions executable by said at least one processor, whereby the wireless communication device is operative to, based on at least one of the first DRX configuration and the second DRX configuration, participate in D2D communication with one or more further wireless communication devices.

According to a further embodiment, a node for a wireless communication network is provided. The node is configured to configure a wireless communication device to simultaneously maintain a first DRX configuration for D2D communication with one or more further wireless communication devices and a second DRX configuration for D2D communication with one or more further wireless communication devices.

According to a further embodiment, a node for a wireless communication network is provided. The node comprises at least one processor and a memory. The memory contains instructions executable by said at least one processor, whereby the node is operative to configure a wireless communication device to simultaneously maintain a first DRX configuration for D2D communication with one or more further wireless communication devices and a second DRX configuration for D2D communication with one or more further wireless communication devices.

According to a further embodiment of the invention, a computer program or computer program product is provided, e.g., in the form of a non-transitory storage medium, which comprises program code to be executed by at least one processor of a wireless communication device. Execution of the program code causes the wireless communication device to simultaneously maintain a first DRX configuration for D2D communication and a second DRX configuration for D2D communication. Further, execution of the program code causes the wireless communication device to, based on at least one of the first DRX configuration and the second DRX configuration, participate in D2D communication with one or more further wireless communication devices.

According to a further embodiment of the invention, a computer program or computer program product is provided, e.g., in the form of a non-transitory storage medium, which comprises program code to be executed by at least one processor of a node for a wireless communication network. Execution of the program code causes the node to configure a wireless communication device to simultaneously maintain a first DRX configuration for D2D communication with one or more further wireless communication devices and a second DRX configuration for D2D communication with one or more further wireless communication devices.

Details of such embodiments and further embodiments will be apparent from the following detailed description of embodiments.

DETAILED DESCRIPTION

Figure 1:
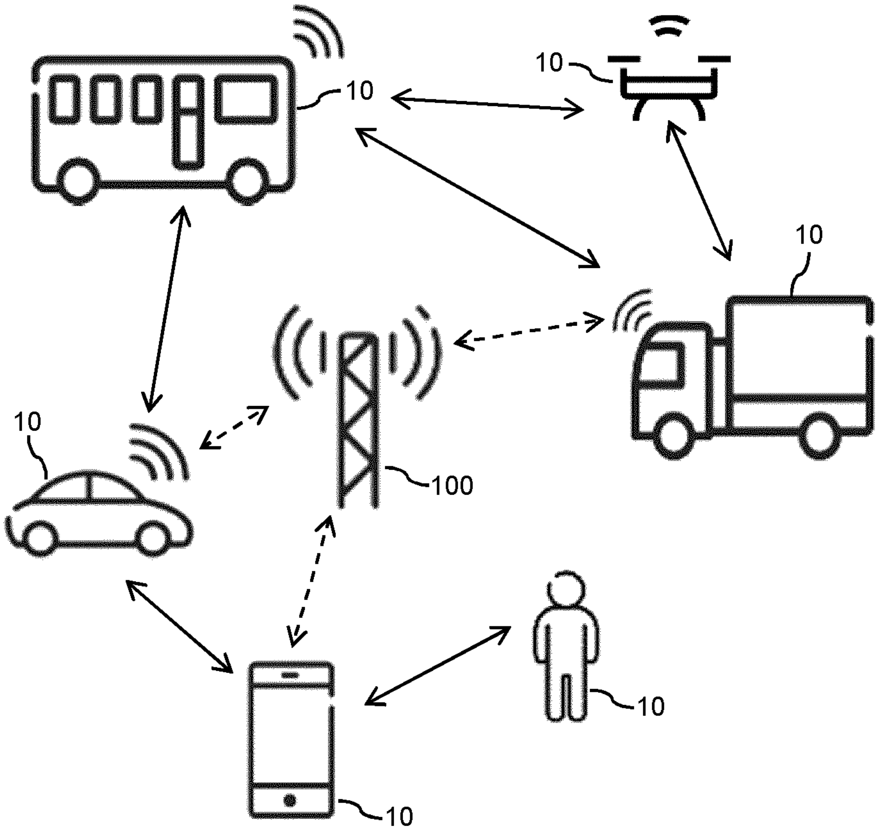
FIG. 1 schematically illustrates an exemplary V2X scenario in which D2D communication may be controlled according to an embodiment of the invention.

In the following, concepts in accordance with exemplary embodiments of the invention will be explained in more detail and with reference to the accompanying drawings. The illustrated embodiments relate to controlling of D2D communication by wireless communication devices. These wireless communication devices may include various types of UEs or other wireless devices (WDs). As used herein, the term "wireless device" (WD) refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP, e.g., on the PC5 interface of the LTE or NR technology. However, it is noted that the illustrated concepts could also be applied to other radio technologies, e.g., a WLAN (Wireless Local Area Network) technology.

In the illustrated concepts, D2D communication may be performed in an energy efficient manner by using procedures and mechanisms which enable DRX operation for D2D communication. The DRX operation may for example be applied to sidelink (SL) communication via the PC5 interface of the LTE or NR technology, which herein denoted by "SL DRX". The DRX operation may involve configuring a UE which participates in D2D communication with a DRX active time and a DRX inactive time. A sequence of one DRX active time and subsequent DRX inactive time may also be denoted as "SL DRX cycle", keeping in mind that the SL DRX cycle does not need to repeat in a periodic manner and that durations of the active time and/or of the inactive time may vary from one SL DRX cycle to the next.

In the D2D communication considered herein, the UE may act as a receiver, herein also denoted as RX UE, and/or as a transmitter, herein also denoted as TX UE. For the TX UE, participating in the D2D communication may involve that during the DRX active time, the TX UE sends at least one D2D transmission to the RX UE. For the RX UE, participating in the D2D communication may involve that during the DRX active time, the RX UE receives at least one D2D transmission from the TX UE. During the DRX inactive time, the RX UE may switch off at least a part of its receiver circuitry to enable energy saving. During the DRX active time, the RX UE is in an DRX active mode and not allowed to switch off parts of its receiver circuitry. The transitions between the DRX active time and the DRX inactive time are controlled according to a DRX configuration of the UE, e.g., using one or more timers and related parameters. The TX UE may consider the DRX inactive time by refraining from sending any D2D transmission to the RX UE during the DRX inactive time. Accordingly, the DRX configuration may be used at the RX UE to enable power saving by controlling switching between the DRX active time and DRX inactive time. Further, the DRX configuration may be used at the TX UE to align the outgoing transmissions with the expected DRX behavior of the RX UE or, in the case of groupcast or multicast transmissions, RX UEs.

It is noted that some of the following examples are described from the perspective of an RX UE while others are described from the perspective of a TX UE, but that the roles of the RX UE and the TX UE are interchangeable. Further, a UE can at the same time act as a TX UE and as an RX UE. Further, while examples as explained below may assume that a D2D UE and its serving access node operate using the same radio access technology (RAT), e.g., the NR or LTE technology, the illustrated concepts could be applied to any combination of RATs between the D2D UE and its serving access node. Further, in the illustrated concepts a D2D transmission may be based on a unicast, groupcast, or broadcast transmission mode.

FIG. 1 illustrates an exemplary scenario involving V2X communications. In particular, FIG. 1 shows various UEs 10, which may engage in V2X communication or other D2D communication, illustrated by solid arrows. Further, FIG. 1 shows an access node 100 of a wireless communication network, e.g., an eNB of the LTE technology or a gNB of the NR technology, or an access point of a WLAN. At least some of the UEs 10 may also be capable of communicating by using DL radio transmissions and/or UL radio transmissions, illustrated by broken arrows.

The UEs 10 illustrated in FIG. 1 comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 1 are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device. The V2X communication may also involve utilizing the illustrated mechanisms and procedures to enable DRX operation for the V2X communication between the UEs 10, thereby improving energy efficiency of the V2X communication.

Figure 2:
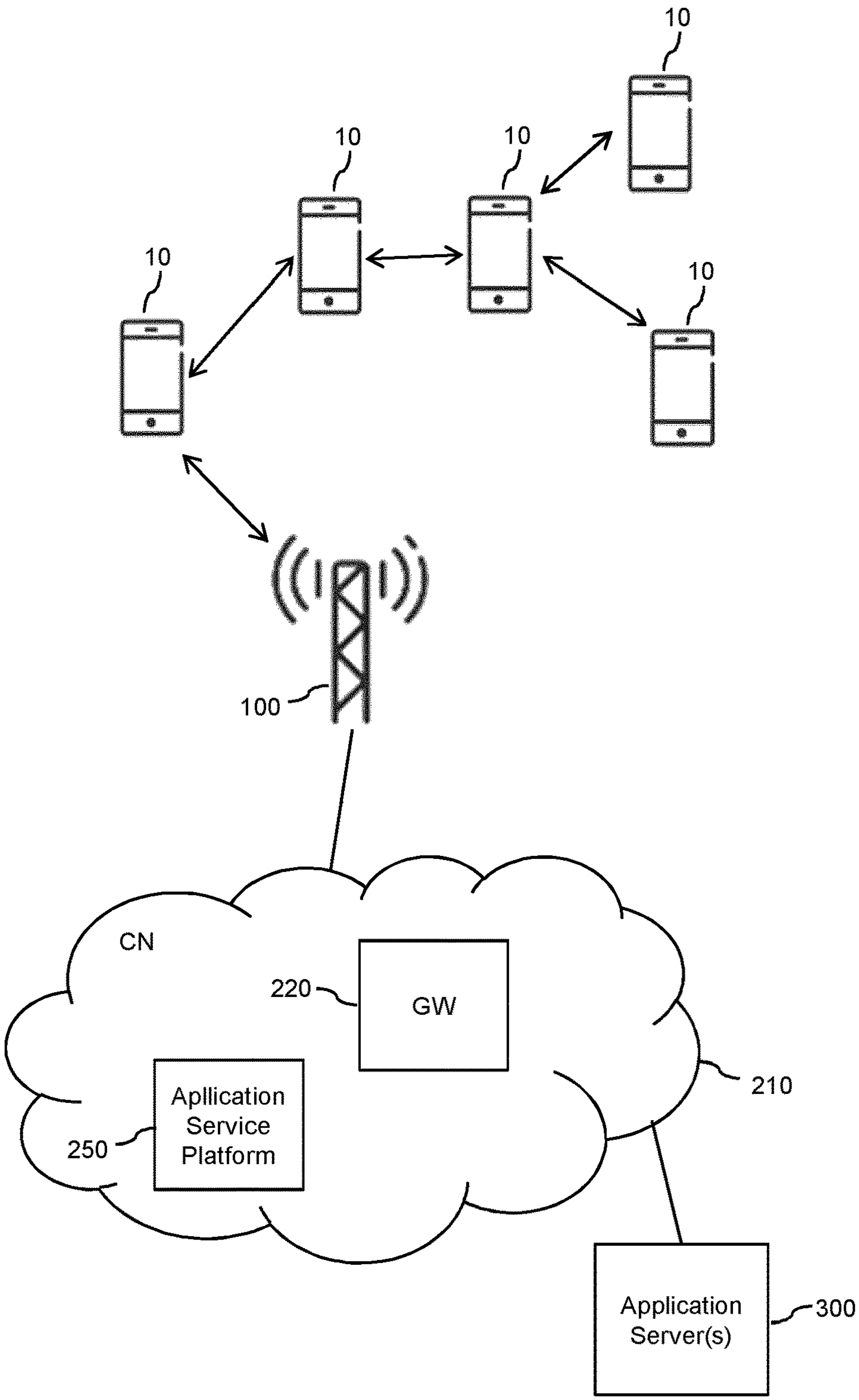
FIG. 2 schematically illustrates an exemplary scenario according to an embodiment of the invention, in which D2D communication may be controlled according to an embodiment of the invention.

FIG. 2 illustrates an exemplary D2D communication scenario. In particular, FIG. 2 shows multiple UEs 10, which are connected to each other by radio links implementing direct wireless links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network. Further, FIG. 2 shows a core network (CN) 210 of the wireless communication network. The CN 210 may provide connectivity of the UEs 10 to other data networks, e.g., through a GW 220 provided in the CN 210. Further, the CN 210 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, an NSPS service, and/or an NCIS service. Such services may be based on applications which are executed on the UE 10 and/or on a device linked to the UE 10. Accordingly, in the illustrated concepts a D2D transmission may convey or correspond to a V2X message, an ITS message, or some other kind of message related to a service. Further, FIG. 2 illustrates an application service platform 250 in the CN 210 of the wireless communication network. Further, FIG. 2 illustrates one or more application servers 300 provided outside the wireless communication network. The application(s) executed on the UE 10 and/or on one or more other devices linked to the UE 10 may use the radio links with one or more other UEs 10, the application service platform 250, and/or the application server(s) 300, thereby enabling the corresponding service(s) on the UE 10. In some scenarios, the services utilized by the UEs 10 may thus be hosted on the network side, e.g., on the application service platform 250 or on the application server(s) 300. However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network. Also in the scenario of FIG. 2, the UEs 10 may apply the DRX operation to the D2D communication to improve energy efficiency.

In the example of FIG. 2, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 1.

Figure 3:
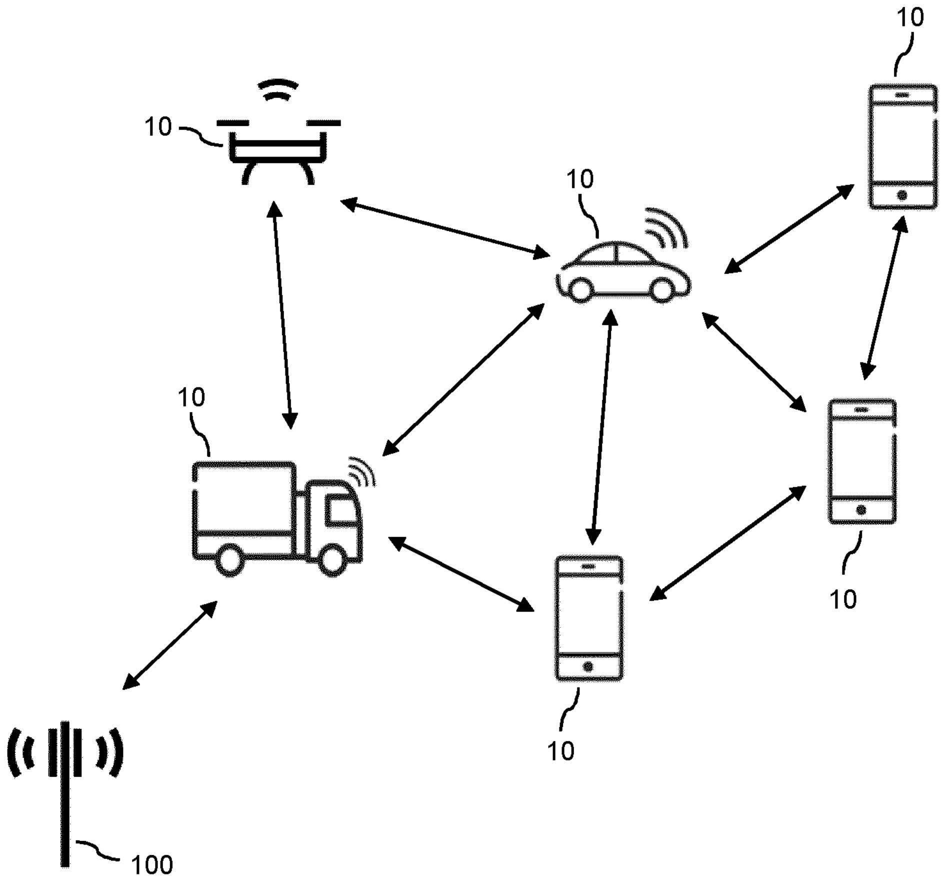
FIG. 3 schematically illustrates an exemplary NSPS communication scenario in which D2D communication may control establishment of a direct wireless link according to an embodiment of the invention.

FIG. 3 schematically illustrates an NSPS communication scenario. In particular, FIG. 3 shows multiple UEs 10, which may exchange NSPS messages associated with one or more NSPS services using D2D communication, e.g., based on the LTE sidelink communication or NR sidelink communication. As further illustrated, the NSPS services may be assisted from the network, by exchanging NSPS messages via access node 100. The NSPS services may for example include group communication of rescue vehicles, rescue personnel or other equipment or personnel of public safety related organizations. Such communication may also involve utilizing the illustrated mechanisms and procedures to enable DRX operation for D2D communication between the UEs 10, thereby improving energy efficiency of the D2D communication.

As mentioned above, in some scenarios the D2D communication to which the DRX operation is applied may be based on the SL mode of the NR or LTE technology, using the PC5 radio interface. In such cases the SL communication may be based on multiple physical channels defined on a physical (PHY) layer of the radio interface between the TX UE and the RX UE, including a Physical sidelink control channel (PSCCH), a Physical sidelink shared channel (PSSCH), a Physical sidelink feedback channel (PSFCH), and a Physical sidelink broadcast channel (PSBCH). The data decoded from the PHY layer may then be further processed by an MAC (Medium Access Control) entity of the RX UE.

The PSCCH carries only control information, usually referred to as the first-stage SCI (Sidelink Control Information). It is transmitted using a predefined format in predetermined radio resources, allowing a RX UE to use blind decoding. That is, a RX UE attempts to decode PSCCH according to the predefined format in the predetermined radio resources, without knowing beforehand whether a PSCCH was indeed transmitted or not. If the decoding operation succeeds, the RX UE assumes that a PSCCH was transmitted. Otherwise, it assumes no PSCCH was transmitted. The PSCCH carries information that is necessary to decode the PSSCH.

The PSSCH carries both control information and data payload. The control information is usually referred to as the second-stage SCI. It is transmitted using the radio resource allocation and transmission format indicated in PSCCH. It contains further information that is necessary to decode the data payload carried by PSSCH too.

The PSFCH carries only feedback information. The contents of PSFCH depends on the mode of HARQ operation. In some cases, both positive (also denoted as ACK) and negative (also denoted as NACK) acknowledgements are transmitted. In other cases, only NACK is transmitted. PSFCH transmission uses a predefined format and takes place in predetermined radio resources.

The PSBCH carries basic system configuration information, e.g., concerning bandwidth, TDD (time-division duplexing) configuration, or the like. Further, the PSBCH carries synchronization signals.

For the SL communication, a typical operation may be as follows: A first UE performs an SL transmission on the PSCCH and PSSCH. A second UE receives the SL transmission. Receiving the SL transmission may involve that, by means of blind decoding, the second UE detects the PSCCH and decodes the first-stage SCI carried by the PSCCH. If the blind decoding is successful, the second UE uses the decoded contents of the PSCCH to decode second-stage SCI carried by the PSSCH. Having decoded the second-stage SCI, the second UE uses the first-stage SCI and the second-stage SCI to decodes payload data carried by the PSSCH. Having successfully decoded the payload data, the second UE proceeds to transmit HARQ (Hybrid Automatic Repeat Request) feedback on the PSFCH. Different modes of providing the HARQ feedback may be utilized. The first UE expects to receive the HARQ feedback from the second UE and may use the presence and contents of the PSFCH to determine further actions, e.g., whether to perform a retransmission or not. Accordingly, the PSDCH may be is used to trigger actions related to HARQ operation for the SL transmission. The utilization of the HARQ feedback may also be omitted in some cases. For example, HARQ feedback is typically not utilized for SL transmissions in broadcast mode. The TX UE (e.g., the first UE in the considered example) may indicate in the SCI whether or not it expects the RX UE (e.g., the second UE in the considered example) to transmit the PSFCH with HARQ feedback.

In the illustrated concepts, the DRX operation for SL transmissions is based on configuring multiple SL DRX configurations of a UE. In particular, the UE simultaneously maintains two or more SL DRX configurations, selectively applies one or more of these SL DRX configurations when receiving or sending SL transmissions. For this purpose, the UE may selectively enable or disable certain SL DRX configurations.

In some scenarios, one or more of the SL DRX configurations may be class-specific, i.e., each be associated with a specific class of SL traffic. When the UE receives or transmits data packets of the specific class, these data packets may be used to control the DRX behavior associated with the corresponding SL DRX configuration, e.g., by starting, stopping, or resetting timers, so that a result the UE switches between the DRX active time and the DRX inactive time. Since the DRX behavior is controlled per SL DRX configuration, there may also be an individual DRX active time and an individual DRX inactive time for each SL DRX configuration. However, it should be noted that the individual DRX active times and the individual DRX inactive times typically combine to an overall pattern according to which the UE is either in a global DRX active time or a global DRX inactive time. In some aspects of the present disclosure it can be utilized which SL DRX cycle triggered switching to the current DRX active time, e.g., when deciding whether to transmit data packets of a certain SL traffic class or data packets of which SL traffic class should be transmitted.

In some scenarios, the multiple SL DRX configurations may include a specific SL DRX configuration associated with a specific class of SL traffic, or multiple specific SL DRX configuration each associated with a specific class of SL traffic, and a common SL DRX configuration which is generic for multiple or all classes of SL traffic. The common SL DRX configuration may then for example be used for those classes of SL traffic which do not have an associated specific SL DRX configuration. Further, the common SL DRX configuration may be used as a fallback or for bootstrapping a specific SL DRX configuration.

In the following, the illustrated concepts will be described in more detail, in particular considering procedures and mechanisms for operating multiple SL DRX configurations at the same time, and procedures and mechanisms of providing SL DRX configurations which can be maintained and operated at the same time. Here, it is to be noted that the latter procedures and mechanisms could also be used independently of the first-mentioned procedures for operating multiple SL DRX configurations at the same time.

As used herein, an SL DRX configuration can be enabled (which could also be denoted as "activated" or "true") or disabled (which could also be denoted as "deactivated" or "false"). Here, an SL configuration which is enabled is being used for controlling switching between the DRX active time and the DRX inactive time. An SL configuration which is disabled is configured in the UE, i.e., its parameters are defined and stored in the UE, but currently not used for controlling switching between the DRX active time and the DRX inactive time. In some parts of this invention, we refer to a DRX configuration being enabled or disabled.

As mentioned above, in some scenarios a UE may be configured with one or more class specific SL DRX configurations. Such class specific SL configuration is herein also denoted as S-DRX configuration. Each S-DRX configuration is associated with one specific class of SL traffic, e.g., a specific class of data packets conveyed by SL transmissions. Typically, it is possible to decide for each data packet conveyed by an SL transmission whether or not it belongs to the specific class of SL traffic. Accordingly, various types of information associated with the data packets can be used to define the specific class. Such information may for example include an identity (ID) of a UE sending the data packet, such as a layer 1 (L1) ID used on the PHY layer, a layer 2 (L2 ID) sued on an MAC layer. In addition or as an alternative, such information may for example include a source or destination address carried by the data packet, e.g., a L1 address or a L2 address. In addition or as an alternative, such information may for example include a combination of L1 IDs, or L2 IDs. For example, a combination of L1 IDs or L2 IDs may be used to identify an SL unicast link. In addition or as an alternative, such information may for example include a link identity, e.g., an identity of an SL unicast link. In addition or as an alternative, such information may for example include a transmission mode of the data packet, indicating whether the data packet is transmitted by unicast, groupcast or broadcast. For groupcast, multiple subtypes may be identified. In addition or as an alternative, such information may for example include a service identifier, e.g., identifying whether the data packet relates to a road safety service, a public safety service, or the like. In addition or as an alternative, such information may for example include location information, e.g., a zone identifier. In addition or as an alternative, such information may for example include identify a QoS (Quality of Service) flow, a QoS level, a QoS class, or a priority level of the data packet.

The S-DRX configuration defines a DRX active state and a DRX inactive state, corresponding to the above-mentioned DRX active time and DRX inactive time, respectively. For the S-DRX configuration, these states are herein also denoted as S-ACTIVE state (S-ACT) and S-INACTIVE state (S-INACT), respectively. Further, the S-DRX configuration defines transitions between the S-ACTIVE and S-INACTIVE state.

The S-DRX configuration may be used to enable power efficient transmission of data packets of the specific class. For this purpose, the behavior of the RX UE may be as follows: If the RX UE is configured with the S-DRX configuration, it monitors the SL radio resources for SL transmissions including data packets of the specific class whenever it is in the S-ACTIVE state. While the RX UE in the S-INACTIVE state, it is allowed to disregard or discard any received data packets of the specific class, or to even switch off parts of its receiver circuitry so that there is no reception of any SL transmission. This behavior may be configured or pre-configured in the UE. In a corresponding manner, the TX UE whose, at least potential, RX UE(s) are configured with the S-DRX configuration may operate by transmitting data packets of the specific class only while the RX UE(s) are in the S-ACTIVE state.

In some scenarios, the class of a data packet may be indicated using L1 or L2 control signaling, e.g., in SCI or a MAC CE (Control Element). Alternatively or in addition, the class of a data packet may be indicated in a header of a packet. For example, an identity and/or address and/or transmission mode may be indicated in SCI of the SL transmission conveying the data packet. If a given data packet can be assigned to different classes, the class indicated by the L1 or L2 control signalling can be selected to correspond to the one which is relevant for the given SL transmission, e.g., depending on the identities of TX UE and RX UE and/or depending on the utilized SL radio bearer.

In some scenarios, the S-DRX configuration may enabled once it is configured or reconfigured. Configuration or reconfiguration of the S-DRX configuration may for example be performed as part of an SL connection establishment procedure, as part of an SL radio bearer configuration procedure, or as part of an SL radio bearer reconfiguration procedure. For unicast, the S-DRX configuration could be configured or reconfigured using an RRC (Radio Resource Control), e.g., a PC5 RRC message. For example, when configuring or reconfiguring the S-DRX configuration per SL unicast connection, the initiating UE may send a dedicated PC5-RRC message, containing the S-DRX configuration for the established SL unicast connection, to the peer UE. This may be accomplished after a PC5-S message exchange to establish the SL unicast connection and setup the security. In another example, when configuring or reconfiguring the S-DRX configuration per SL radio bearer, the initiating UE may include the S-DRX configuration in a PC5-RRC RRCReconfigurationSidelink message sent to the peer UE.

In some scenarios, the S-DRX configuration may also have a configurable initial state, e.g., defined by an SL AS (Access Stratum) configuration. The initial state can be configured as enabled or as disabled. The initial state after configuring the S-DRX configuration can thus be defined according to the current needs. Further, the state can be changed by reconfiguration.

For example, if the S-DRX configuration is configured with an initial state of "disabled", the S-DRX configuration may be enabled by another control message, i.e., a control message which is separate from the control message providing the S-DRX configuration. By way of example, the TX UE could enable the S-DRX configuration at the RX UE by sending a control message to the RX UE. Further, the RX UE may decide to enable the S-DRX configuration and inform the TX UE by sending a control message to the TX UE. In each case, the control message may correspond to a dedicated PC5-RRC message, a MAC CE, or a layer-1 signalling, such as a command carried by SCI.

In some scenarios, the S-DRX configuration may be implicitly enabled by an SL transmission, which does not need to include a control message. For example, if a UE sends or receives an SL transmission with a data packet of the specific class, this may enable the S-DRX configuration at the UE. In this case, the UE may also start a timer upon receiving or sending the SL transmission, and the UE may keep the S-DRX configuration enabled until expiry of the timer. The timer can be configured together with the S-DRX configuration or by a separate control message, e.g., a dedicated PC5-RRC message, a MAC CE, or a layer-1 signalling, such as a command carried by SCI.

In some scenarios, the S-DRX configuration may be enabled by a control message which indicates a starting time, e.g., in terms of a time slot, from which the S-DRX configuration is to be enabled. For example, the TX UE may instruct the RX UE to enable the S-DRX configuration by sending a control message which indicates a given time slot from which the RX UE shall enable the S-DRX configuration. Further, the TX UE may instruct the RX UE to enable the S-DRX configuration by sending a control message which indicates an offset number of time slots after which the RX UE shall enable the S-DRX configuration.

In some scenarios, a UE may also enable the S-DRX configuration based on upcoming data traffic. For example, the S-DRX configuration could be enabled at the TX UE when the TX UE intends to send data packets belonging to the specific class. Similarly, the S-DRX configuration could be enabled at the RX UE when the RX UE expects to receive data packets belonging to the specific class.

Which of the above variants are available for enabling the S-DRX configuration may also be configurable, e.g., as part of the S-DRX configuration.

Disabling the S-DRX configuration may be accomplished in various ways. In some scenarios, the S-DRX configuration is disabled during termination of the SL connection or SL radio bearer. In some cases, the S-DRX configuration may be released autonomously by the RX UE and/or TX UE.

For example, if a SL unicast connection is terminated, the S-DRX configuration for this SL unicast connection may be disabled.

In some scenarios, the S-DRX configuration may be disabled by a control message. For example, the TX UE may disable the S-DRX configuration at the RX UE by sending a control message to the RX UE. Further, the RX UE may disable the S-DRX configuration and inform the TX UE by sending a control message to the TX UE. In each case, the control message may be a dedicated PC5-RRC message, a MAC CE, or L1 signalling, such as a command carried by SCI.

In some scenarios, the S-DRX configuration may be disabled when a timer expires. For example, a timer may be reset every time when the UE sends or receives a data packet of the specific class. If for a certain time no data packet of the specific class is sent or received, the time will expire, which disables the S-DRX configuration. This timer-based disabling of the S-DRX configuration may be applied at the TX UE and/or at the RX UE. The setting of the timer for controlling disabling of the S-DRX configuration can be a common to multiple or all S-DRX configurations, or could be configured individually for each S-DRX configuration, e.g., as part of the S-DRX configuration.

In some scenarios, a UE may also enable the S-DRX configuration based on upcoming data traffic. For example, the S-DRX configuration may be disabled at the TX UE when the TX UE has no more data packets of to the specific class to be sent. At the RX UE, the S-DRX configuration may be disabled a when the RX UE no longer expects to receive data packets of the specific class.

Figure 4A:
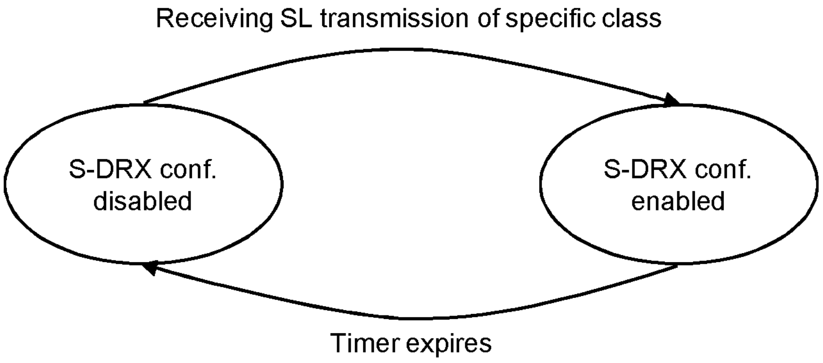
FIG. 4A schematically illustrates a state diagram for illustrating usage of a received SL transmission for enabling and disabling of a class specific SL DRX configuration according to an embodiment of the invention.

FIG. 4A shows a state diagram for illustrating an example where the S-DRX configuration is enabled by reception of data packets of the specific class and disabled in response to expiry of a timer. If in the example of FIG. 4A the S-DRX configuration is in the disabled state, the S-DRX configuration is enabled when the UE receives a data packet of the specific class. A timer is reset every time when the UE receives a further packet of the specific class. When the timer expires, the S-DRX configuration is disabled. The procedures of the example of FIG. 4A may be applied at the RX UE and/or at the TX UE. Further, it is noted that the UE can be configured in such a way that receiving a data packet not belonging to the specific class has no impact on the state of the S-DRX configuration associated with the specific class.

Figure 4B:
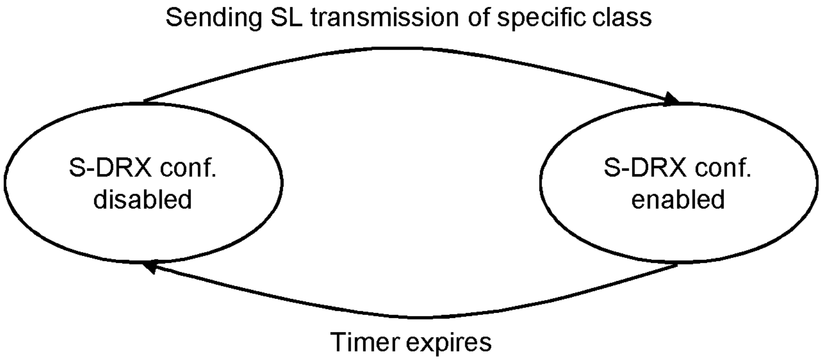
FIG. 4B schematically illustrates a state diagram for illustrating usage of a sent SL transmission for enabling and disabling of a class specific SL DRX configuration according to an embodiment of the invention.

FIG. 4B shows a state diagram for illustrating an example where the S-DRX configuration is enabled by sending of data packets of the specific class and disabled in response to expiry of a timer. If in the example of FIG. 4B the S-DRX configuration is in the disabled state, the S-DRX configuration is enabled when the UE sends a data packet of the specific class. A timer is reset every time when the UE sends a further packet of the specific class. When the timer expires, the S-DRX configuration is disabled. The procedures of the example of FIG. 4B may be applied at the TX UE and/or at the RX UE. Further, it is noted that the UE can be configured in such a way that sending a data packet not belonging to the specific class has no impact on the state of the S-DRX configuration associated with the specific class.

As mentioned above, the usage of one or more S-DRX configurations may also be combined with a common SL DRX configuration which is generic for multiple or all classes of SL traffic, herein also denoted as C-DRX configuration. The C-DRX configuration may thus also be applicable to classes of SL traffic which are different from any of the considered specific classes. The C-DRX configuration defines a DRX active state and a DRX inactive state, corresponding to the above-mentioned DRX active time and DRX inactive time, respectively. For the C-DRX configuration, these states are herein also denoted as C-ACTIVE state (C-ACT) and C-INACTIVE state (C-INACT), respectively. Further, the C-DRX configuration defines transitions between the C-ACTIVE and C-INACTIVE state.

Figure 5A:
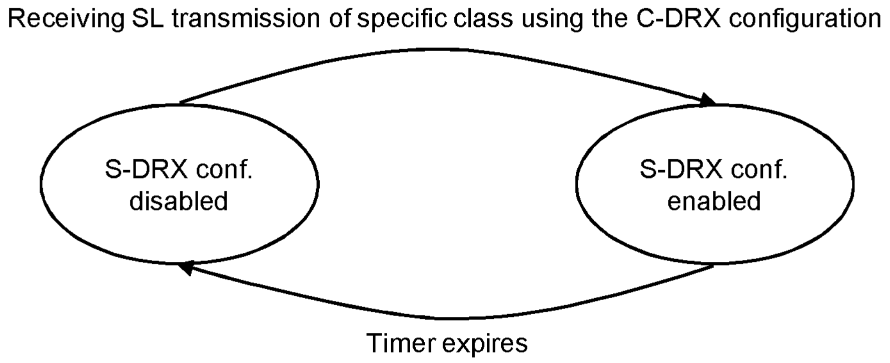
FIG. 5A schematically illustrates a state diagram for illustrating usage of a SL transmission, received on the basis of a generic SL DRX configuration, for enabling and disabling of a class specific SL DRX configuration according to an embodiment of the invention.
Figure 5B:
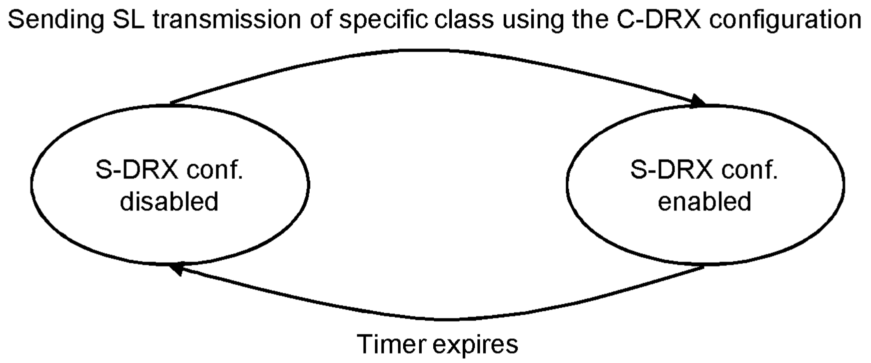
FIG. 5B schematically illustrates a state diagram for illustrating usage of a SL transmission, sent on the basis of a generic SL DRX configuration, for enabling and disabling of a class specific SL DRX configuration according to an embodiment of the invention.

The C-DRX configuration may be used for multiple purposes. For example, the C-DRX configuration may enable a power efficient reception of data packets, regardless of whether they belong to any specific class or not. For example, the C-DRX configuration can be used by the TX UE to transmit a data packet to when the TX UE does not have sufficient information to determine which S-DRX configuration to use. Further, the C-DRX configuration may be used for bootstrapping of S-DRX configurations, i.e., to enable information exchange between the RX UE and TX UE for purposes of establishing an S-DRX configuration. For example, two UEs may use the C-DRX configuration to establish a unicast SL connection and one or more associated S-DRX configuration(s). The C-DRX configuration may also be used for dynamically enabling and/or disabling an S-DRX configuration. For example, when an S-DRX configuration associated with a specific class of SL traffic is disabled, sending or receiving of SL transmissions with data packets of this specific class may be accomplished on the basis of the C-DRX configuration. FIGS. 5A and 5B illustrate corresponding examples.

FIG. 5A shows a state diagram for illustrating an example where the S-DRX configuration is enabled by reception of data packets of the specific class based on the C-DRX configuration and disabled in response to expiry of a timer. If in the example of FIG. 5A the S-DRX configuration is in the disabled state, the S-DRX configuration is enabled when the UE receives a data packet of the specific class. The UE receives this data packed based on the C-DRX configuration. Accordingly, power efficiency can be increased already before the S-DRX configuration is enabled. A timer is reset every time when the UE receives a further packet of the specific class. When the timer expires, the S-DRX configuration is disabled. The procedures of the example of FIG. 5A may be applied at the RX UE and/or at the TX UE. Further, it is noted that the UE can be configured in such a way that receiving a data packet not belonging to the specific class has no impact on the state of the S-DRX configuration associated with the specific class.

FIG. 5B shows a state diagram for illustrating an example where the S-DRX configuration is enabled by sending of data packets of the specific class based on the C-DRX configuration and disabled in response to expiry of a timer. If in the example of FIG. 5B the S-DRX configuration is in the disabled state, the S-DRX configuration is enabled when the UE sends a data packet of the specific class. The UE sends this data packed based on the C-DRX configuration. Accordingly, power efficiency can be increased already before the S-DRX configuration is enabled. A timer is reset every time when the UE sends a further packet of the specific class. When the timer expires, the S-DRX configuration is disabled. The procedures of the example of FIG. 5B may be applied at the RX UE and/or at the TX UE. Further, it is noted that the UE can be configured in such a way that sending a data packet not belonging to the specific class has no impact on the state of the S-DRX configuration associated with the specific class.

The combination of the C-DRX configuration and one or more S-DRX configurations may provide several benefits. For example, the C-DRX configuration provides a fallback configuration, which can for example be used after a connection failure. Further, the C-DRX configuration may be used for efficiently for bootstrapping the S-DRX configuration(s). Further, the C-DRX configuration may allow for long inactivity periods in which the UE can enter a power saving mode, while the S-DRX configuration(s) could be optimized in view of fast exchange of messages between UEs and only be enabled on demand.

When using multiple SL DRX configurations, e.g., one or more S-DRX configurations and a C.DRX configuration, an overall DRX active state and overall DRX inactive state by considering the states of the individual SL DRX configurations in combination. For example, an overall DRX active time may correspond to the time when any of the individual SL DRX configurations in DRX active time. Otherwise, the UE is in an overall DRX inactive time.

Figure 6:
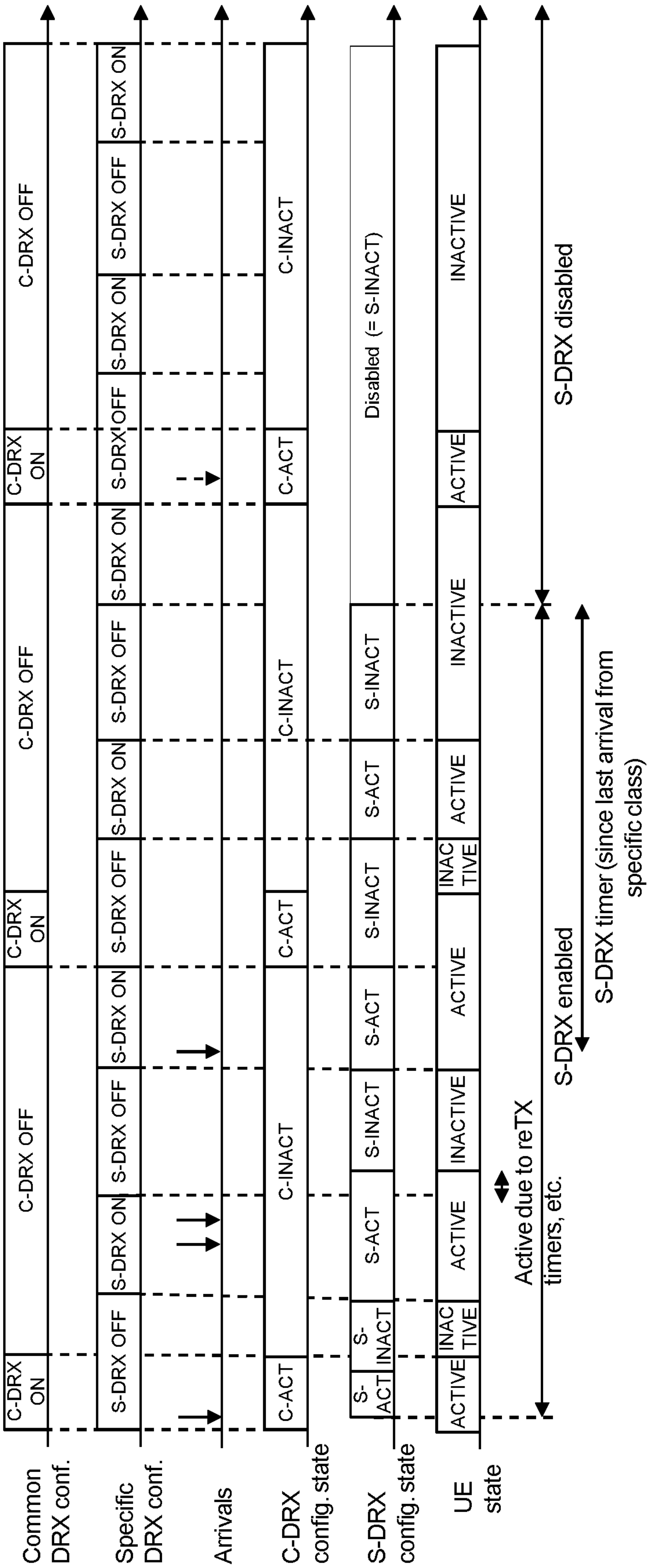
FIG. 6 schematically illustrates an exemplary scenario where a generic SL DRX configuration and a class specific SL DRX configuration are simultaneously operated according to an embodiment of the invention.

FIG. 6 illustrates an example for illustrating the enabling of the S-DRX configuration based on sending or reception of an SL transmission of the specific class and disabling the S-DRX configuration based on a timer. In particular, FIG. 6 shows the enabling and disabling of S-DRX configuration, as well as the of the states of the C-DRX configuration and the S-DRX configuration as they change over time. In the example of FIG. 6, the reception of a data packet of the specific class associated with the S-DRX configuration is illustrated by solid vertical arrows, and the reception of a data packet of some other class is illustrated by a dashed vertical arrow. As can be seen, the reception of a data packet of the specific class enables the S-DRX configuration or keeps it enabled. The reception of a data packet of some other class does not enable or otherwise impact enablement of the S-DRX configuration.

The TX UE may be configured with the following behavior depending on the states of the C-DRX configuration and/or S-DRX configuration:

- In some variants, the TX UE may transmit data packets of a specific class only during the DRX active times of the associated S-DRX configuration, in particular while its own S-DRX configuration and/or the S-DRX configuration of the RX UE(s) is in S-ACTIVE state.
- In some variants, the TX UE may transmit a number of N data packets of the specific class during the DRX active times of the C-DRX configuration, in particular while its own C-DRX configuration and/or the C-DRX configuration of the RX UE(s) is in C-ACTIVE state. These N data packets may for example be used to enable the associated S-DRX configuration at the RX UE(s). In some cases the number of N may be N=1.
- In some variants, the TX UE may transmit data packets of the specific class during the DRX active times of the associated S-DRX configuration or during the DRX active times of the C-DRX configuration or during the DRX active times of some other DRX configuration, e.g., an S-DRX configuration associated with another class, in particular while its own S-DRX configuration and/or the S-DRX configuration of the RX UE(s) is in S-ACTIVE state or while the its own C-DRX configuration and/or the C-DRX configuration of the RX UE(s) is in C-ACTIVE state or while some other DRX configuration at the TX UE and/or at the RX UE is in the DRX active state.
- In some variants, the TX UE may transmit data packets of the specific class if any of its DRX configurations is in the DRX active state, also for S-DRX configurations associated with other classes than the specific class.
- In some variants, during the DRX active time of the S-DRC configuration associated with a specific class transmission of data packets of the specific class is given a higher priority than transmission of data packets of other classes.
- In some variants, the TX UE may transmit data packets of the specific class during the DRX active times of the C-DRX configuration or during the DRX active times of some other DRX configuration, e.g., an S-DRX configuration associated with another class, only if the congestion level in the DRX active is below a certain threshold.
- In some variants, if multiple DRX active times of different DRX configurations are available, the TX UE may select the DRX active to be used for transmitting packets of the specific class. This selection may be accomplished depending on the congestion levels in the considered DRX active times. For example, the TX UE may decide to transmit in a given DRX active time only if the congestion level in this DRX active time is below a certain threshold.
- In some variants, the TX UE may transmit data packets that do not belong to any specific class having an associated configured S-DRX configuration only during the DRX active times of the C-DRX configuration, in particular only while its own C-DRX configuration and/or the C-DRX configuration at the RX UE(s) is in C-ACTIVE state. For example, for an SL unicast transmission of a data packet, the TX UE may transmit an SL-SRB message, e.g., PC5-S or PC5-RRC message, only while the C-DRX configuration is in C-ACTIVE state. According to a further example, for an SL unicast packet transmission, the TX UE may transmit a standalone SL CSI (Channel State Information) report, i.e., an SL transmission with a transport block that includes only an SL CSI report, only during the DRX active times of the C-DRX configuration, in particular only while its own C-DRX configuration and/or the C-DRX configuration at the RX UE(s) is in C-ACTIVE state. According to a further example, for SL groupcast transmissions and SL broadcast transmissions of a data packet, the TX UE may transmit the data packet only during the DRX active times of the C-DRX configuration, in particular only while its own C-DRX configuration and/or the C-DRX configuration at the RX UE(s) is in C-ACTIVE state.
- In some variants, the TX UE may transmit data packets that do not belong to the specific class during the DRX active times of the S-DRX configuration associated with the specific class or during the DRX active times of the C-DRX configuration or during the DRX active times of some other DRX configuration, e.g., an S-DRX configuration associated with some other class, in particular while its own S-DRX configuration associated with the specific class and/or the S-DRX configuration associated with the specific class at the RX UE(s) is in S-ACTIVE state or while its own C-DRX configuration and/or the C-DRX configuration at the RX UE(s) is in C-ACTIVE state or while the other DRX configuration at the TX UE and/or at the RX UE(s) is in the DRX active state.
- In some variants, a choice among at least some of the preceding behaviors of the TX UE may be negotiated and agreed between the TX UE and RX UE(s) during connection establishment. Further, a choice among at least some of the preceding behaviors of the TX UE may be configured by a node of the wireless communication network or may be part of a pre-configuration, e.g., based on a standard, manufacturer settings, or network operator settings.

In some variants, e.g., based on configuration or pre-configuration of the TX UE, transmitting data packets of a specific class in the C-ACTIVE state or in the S-ACTIVE state of an S-DRX configuration associated with another class may or may not have impact on this C-ACTIVE state or S-ACTIVE state. For example, e.g. it could be configured or pre-configured in the UE whether in this case the DRX active time of the C-DRX configuration or the DRX active time of the S-DRX configuration associated with the other class should be extended, e.g., by starting or resetting a timer.

The RX UE may be configured with the following behavior depending on the states of the C-DRX configuration and/or S-DRX configuration:

In some variants, the RX UE is expected to process, e.g., receive, data packets of the specific class only during the DRX active times of the S-DRX configuration associated with the specific class, in particular while its own S-DRX configuration and/or the S-DRX configuration of the TX UE is in S-ACTIVE state. Otherwise, the RX UE is not expected to process data packets of the specific class and may for example disregard or discard them.

In some variants, the RX UE is expected to process, e.g., receive, data packets of the specific class during the DRX active times of the associated S-DRX configuration or during the DRX active times of the C-DRX configuration or during the DRX active times of some other DRX configuration, e.g., an S-DRX configuration associated with another class, in particular while its own S-DRX configuration and/or the S-DRX configuration of the TX UE is in S-ACTIVE state or while the its own C-DRX configuration and/or the C-DRX configuration of the TX UE is in C-ACTIVE state or while some other DRX configuration at the RX UE and/or at the TX UE is in the DRX active state. Otherwise, the RX UE is not expected to process data packets of the specific class and may for example disregard or discard them.

In some variants, the RX UE is expected to process, e.g., receive, data packets that do not belong to any specific class having an associated configured S-DRX configuration only during the DRX active times of the C-DRX configuration, in particular only while its own C-DRX configuration and/or the C-DRX configuration at the TX UE is in C-ACTIVE state. Otherwise, the RX UE is not expected to process these data packets and may for example disregard or discard them.

In some variants, the RX UE is expected to process, e.g., receive, data packets that do not belong to the specific class during the DRX active times of the S-DRX configuration associated with the specific class or during the DRX active times of the C-DRX configuration or during the DRX active times of some other DRX configuration, e.g., an S-DRX configuration associated with some other class, in particular while its own S-DRX configuration associated with the specific class and/or the S-DRX configuration associated with the specific class at the TX UE(s) is in S-ACTIVE state or while its own C-DRX configuration and/or the C-DRX configuration at the TX UE is in C-ACTIVE state or while the other DRX configuration at the TX UE and/or at the TX UE is in the DRX active state. Otherwise, the RX UE is not expected to process these data packets and may for example disregard or discard them.

In some variants, a choice among at least some of the preceding behaviors of the RX UE may be negotiated and agreed between the TX UE and RX UE(s) during connection establishment. Further, a choice among at least some of the preceding behaviors of the RX UE may be configured by a node of the wireless communication network or may be part of a pre-configuration, e.g., based on a standard, manufacturer settings, or network operator settings.

In some variants, e.g., based on configuration or pre-configuration of the RX UE, receiving data packets of a specific class in the C-ACTIVE state or in the S-ACTIVE state of an S-DRX configuration associated with another class may or may not have impact on this C-ACTIVE state or S-ACTIVE state. For example, e.g. it could be configured or pre-configured in the UE whether in this case the DRX active time of the C-DRX configuration or the DRX active time of the S-DRX configuration associated with the other class should be extended, e.g., by starting or resetting a timer.

In some scenarios, enabling the S-DRX configuration may void effects of data packets of the specific class on the C-DRX configuration. For example, if the S-DRX configuration is disabled, the reception of a packet of the specific class may have an impact on the C-DRX configuration based DRX operation, e.g., by resetting a timer, triggering a state transition, or the like. If then the S-DRX configuration associated with the specific class is enabled, receiving or sending of a data packet of the specific class would no longer have an impact on the DRX procedure based on the C-DRX configuration, e.g., it would not reset a timer or triggers a state transition for the C-DRX configuration. In other words, from the perspective of the DRX procedure based on the C-DRX configuration, it may appear is as if the data packet had not been received or sent.

In the following, the procedures and mechanisms for providing the DRX configurations to the UEs will be described in more detail. These procedures may in particular be used for providing the above-mentioned S-DRX configuration(s) and/or C-DRX configuration.

In some scenarios, a UE may be provided with one or multiple DRX configurations. As mentioned above, such DRX configuration may be defined by parameters which control the DRX procedure, in particular with respect to transitions between the DRX active time and the DRX inactive time. These parameters may for example include settings of one or more timers. Providing the UE with the DRX configuration may be based on configuration or pre-configuration, e.g., based on a standard, manufacturer settings, or network operator settings. The configuration or pre-configuration may be specific for the UE or part of a resource pool configuration, bandwidth part configuration or carrier configuration.

In some scenarios, the DRX configurations may include the above-mentioned C-DRX configuration and/or one or more of the above-mentioned S-DRX configurations. The S-DRX configuration(s) may each be part of a configuration of a corresponding SL radio bearer.

In some scenarios, the UE may randomly select a DRX configuration among multiple configured or pre-configured DRX configurations to be used for the communication with another UE.

In some scenarios, the UE may select, among multiple configured or pre-configured DRX configurations, or otherwise determine a DRX configuration based on a congestion metric. For example, the UE may measures the congestion on the resources corresponding to the DRX active time of each of the multiple configured or pre-configured DRX configurations and select the one with the lowest value of the congestion metric or select a DRX configuration where the congestion metric is below a threshold.

In some scenarios, the UE may inform other UEs about its selected DRX configuration. For example, the UE may indicates an index of the selected DRX configuration in a message sent to other UEs, e.g., as a part of control message. This may be used to coordinate enablement of a particular DRX configuration by multiple UEs, e.g., as described above.

In some scenarios, the UE may inform one or more other UEs about which DRX configuration is to be used. In such a case, any other DRX configuration which is configured at a UE but not to be used, can be disabled. The indication of which DRX configuration is to be used can be provided via L1 signalling, a MAC CE, or RRC signaling. In some cases, the indication can be provided in the form of bitmap, with each bit of the bitmaps corresponding to one of multiple DRX configurations to be enabled or disabled. Further, the indication could include one or more identifiers of DRX configurations, with each identifier indicating a particular DRX configuration to be enabled or disabled. Such identifier may for example be defined as part of the DRX configuration.

In some scenarios, the UE may also consider the DRX configurations used by other UEs when selecting or otherwise determining its own DRX configuration. For example, the UE may avoid selecting the same DRX configuration that is or was used by other UEs for SL communication that does not involve the UE.

In some scenarios, a specific class of SL communication may determine the DRX configuration to be used by the UE. For example, an identifier or index may be associated with each class of SL communication, or specific class of data packets conveyed by SL communication, and may be used for selecting a DRX configuration among multiple configured or pre-configured DRX configurations, to be used for the specific class of SL communication packets. By way of example, the UE may be provided with N DRX configurations indexed by $\{0, 1, \ldots, N-1\}$. Each specific class SL communication or specific class of data packets may have an identifier or index. The UE may then select, for the specific class with index P, the DRX configuration with the index given by P modulo N.

In some scenarios, the C-DRX configuration may be part of a configuration provided by a network node or part of a pre-configuration. The C-DRC configuration may be always enabled. As compared to that, each S-DRX configuration may be enabled on an as-needed-basis, e.g., while the UE is engaged in ongoing SL communication of the specific class, e.g., in class-specific unicast communication, class-specific groupcast communication, or class-specific broadcast communication. The S-DRX configuration may be configured by a network node, be based on a pre-configuration, or it may be negotiated or otherwise agreed between the UEs engaged in the SL communication.

In some scenarios, the C-DRX configuration may be shared by the UEs that are configured for operation using a certain carrier, a certain resource pool, or a certain bandwidth part, or any combination of a certain carrier, a certain resource pool, and a certain bandwidth part.

In some scenarios, the S-DRX configuration associated with a specific class may be shared by the UEs that have an interest in data packets of the specific class, e.g., are expected to send or transmit data packets of the. For example, such interest can be determined from a specific service utilized by the UE, which is based on data packets of the specific class, or from a location of the UE, e.g., depending on whether the UE is in a specific geographical area.

In some scenarios, the C-DRX may be used by a pair of UEs or by multiple UEs to configure, e.g., select, align, or enable, a S-DRX configuration for them, e.g., to coordinate the utilized S-DRX configurations. This may for example involve using the C-DRX configuration to notify the other UE(s) of the utilized S-DRX configuration or changes of the utilized S-DRX configuration. As mentioned above, the he C-DRX configuration may also be used by two or more UEs to coordinate enabling and/or disabling a certain S-DRX configuration, e.g., by notifying the other UE(s) about enabling or disabling the S-DRX configuration.

It is noted that the principles as explained above, using multiple SL DRX configurations and/or one or more class specific SL DRX configurations, are not limited to SL communication and may also be applied to other types of D2D communication.

Figure 7:
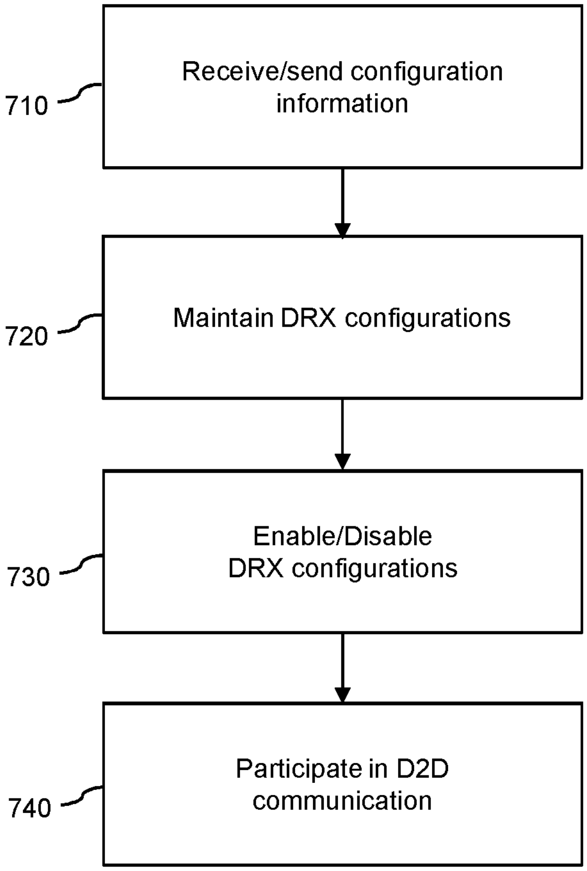
FIG. 7 shows a flowchart for schematically illustrating a method according to an embodiment of the invention.

FIG. 7 shows a flowchart for illustrating a method, which may be utilized for implementing the illustrated concepts. The method of FIG. 7 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well.

If a processor-based implementation of the wireless communication device is used, at least some of the steps of the method of FIG. 7 may be performed and/or controlled by one or more processors of the wireless communication device. Such wireless communication device may also include a memory storing program code for implementing at least some of the below described functionalities or steps of the method of FIG. 7.

At step 710, the wireless communication device may receive and/or send configuration information. For example, the wireless communication device may receive configuration information from one or more other wireless communication devices. Further, the wireless communication device may send configuration information to one or more other wireless communication devices. Further, the wireless communication device may receive configuration information from one or more nodes of a wireless communication network, such as the above-mentioned access node 100. Further, the wireless communication device may send configuration information to one or more nodes of a wireless communication network, such as the above-mentioned access node 100.

At step 720, the wireless communication device simultaneously maintains a first DRX configuration for D2D communication and a second DRX configuration for D2D communication. The first DRX configuration and the second DRX configuration each have the purpose of being used for D2D communication between the wireless communication device and one or more further wireless communication devices. The D2D communication may for example correspond to SL communication, e.g., via the PC5 interface of the LTE technology or the PC5 interface of the NR technology. The first DRX configuration and the second DRX configuration may thus correspond to SL DRX configurations. The first DRX configuration and the second DRX configuration may each be based on one or more timers for controlling transitions between a respective DRX active time and a respective DRX inactive time.

In some scenarios, the wireless communication device may determine at least one of the first DRX configuration and the second DRX configuration based on configuration information received from at least one of the one or more further wireless communication devices, e.g., as received at step 710.

In some scenarios, the wireless communication device may determine at least one of the first DRX configuration and the second DRX configuration based on configuration information received from a node of the wireless communication network, e.g., as received at step 710.

In some scenarios, the wireless communication device may determine at least one of the first DRX configuration and the second DRX configuration based on congestion of radio resources to be used in the D2D communication, e.g., by using a congestion metric as a basis for selecting among a plurality of predefined DRX configurations.

In some scenarios, the wireless communication device may determine at least one of the first DRX configuration and the second DRX configuration based on DRX configurations used by other wireless communication devices. Information on such DRX configurations used by other wireless communication devices could be indicated by configuration information as received at step 710.

In some scenarios, the wireless communication device may determine at least one of the first DRX configuration and the second DRX configuration based on selection among a plurality of pre-defined DRX configurations. The selection among the plurality of pre-defined DRX configurations may at least in part be based on random selection.

In some scenarios, the wireless communication device may determine configuration information for at least one of the first DRX configuration and the second DRX configuration and indicate the determined configuration information to at least one of the one or more further wireless communication devices.

In some scenarios, the first DRX configuration may apply to a plurality of D2D communication classes, while the second DRX configuration may apply only to a specific D2D communication class. The plurality of D2D communication classes may or may not include the specific D2D communication class. The above-mentioned C-DRX configuration is an example of the first DRX configuration. The above-mentioned S-DRC configurations are examples of the second DRX configuration. The D2D communication classes may for example correspond to the above-mentioned classed of SL communication or classes of data packets conveyed by SL transmissions.

The D2D communication classes may be defined on the basis of identifiers of wireless communication devices participating in the D2D communication, e.g., L1 identifiers or L2 identifiers, and/or addresses of wireless communication devices participating in the D2D communication, e.g., L1 addresses or L2 addresses. Alternatively or in addition, the D2D communication classes may be defined on the basis of identifiers of D2D communication links used in the D2D communication. Alternatively or in addition, the D2D communication classes may be defined on the basis of whether the D2D communication is based on a unicast transmission mode. Alternatively or in addition, the D2D communication classes may be defined on the basis of whether the D2D communication is based on a groupcast transmission mode. Alternatively or in addition, the D2D communication classes may be defined on the basis of whether the D2D communication is based on a broadcast transmission mode. Alternatively or in addition, the D2D communication classes may be defined on the basis of one or more service types using the D2D communication. Alternatively or in addition, the D2D communication classes may be defined on the basis of locations of wireless communication devices participating in the D2D communication. Alternatively or in addition, the D2D communication classes may be defined on the basis of one or more Quality of Service attributes used in the D2D communication. Alternatively or in addition, the D2D communication classes may be defined on the basis of data traffic characteristics of the D2D communication, e.g., considering a periodicity or other patterns of data packet arrival.

In some scenarios, the wireless communication device could simultaneously maintain the first DRX configuration for D2D communication and a multiple second DRX configurations for D2D communication, with the second DRX configurations each applying to a different specific D2D communication class. For example, the wireless communication device could simultaneously maintain the above-mentioned C-DRC configuration and multiple of the above-mentioned S-DRX configurations.

At step 730, the wireless communication device may select whether to enable the first DRX configuration and/or the second DRX configuration. The selection of step 730 may, at least in part, be based on the D2D communication with the one or more further wireless communication devices. Alternatively or in addition, the selection of step 730 may, at least in part, be based on congestion of radio resources to be used in the D2D communication, e.g., on a congestion metric. Alternatively or in addition, the selection of step 730 may, at least in part, be based on random selection. Alternatively or in addition, the selection of step 730 may, at least in part, be based on information received from at least one of the one or more further wireless communication devices, e.g., on the configuration information received at step 710. Alternatively or in addition, the selection of step 730 may, at least in part, be based on information received from a node of a wireless communication network, e.g., on the configuration information received at step 710.

In some scenarios, the wireless communication device may indicate the selected at least one of the first DRX configuration and/or the second DRX configuration to at least one of the one or more further wireless communication devices, e.g., by means of configuration information as sent at step 710.

As mentioned above, in some scenarios the first DRX configuration applies to a plurality of D2D communication classes and the second DRX configuration applies to a specific D2D communication class. In some cases this plurality of D2D communication classes may include the specific D2D communication class.

In such case, step 730 may involve that, in response to a first D2D transmission, the wireless communication device enables the second DRX configuration. The first D2D transmission may belong to the specific D2D communication class. Alternatively or in addition, the first D2D transmission may include a command to enable the second DRX configuration. For example, the first D2D transmission may convey a corresponding control message or corresponding control signalling. In some cases, in response to enabling the second DRX configuration, the wireless communication device may start a timer for controlling enablement of the second DRX configuration.

Further, step 730 may involve that in response to a second D2D transmission, the wireless communication device disables the second DRX configuration. The second D2D transmission may include a command to disable the second DRX configuration. For example, the second D2D transmission may convey a corresponding control message or corresponding control signalling. In some cases, the wireless communication device may disable the second DRX configuration in response to expiry of a timer. As mentioned above, the wireless communication device may start the timer in response to enabling the second DRX configuration. Further, the wireless communication device could reset the timer in response to a D2D transmission of the specific D2D communication class. In some cases, the wireless communication device could also disable the second DRX configuration in response to releasing a D2D communication link used in the D2D communication of the specific class. In some cases, the wireless communication device could also disable the second DRX configuration in response to cease of D2D communication of the specific class.

At step 740, the wireless communication device participates in D2D communication with one or more further wireless communication devices. This is accomplished based on at least one of the first DRX configuration and the second DRX configuration. Participating in the D2D communication may involve that, during a DRX active time, the wireless communication device receives at least one D2D transmission from at least one of the one or more further wireless communication devices. The wireless communication device may thus correspond as an RX UE, e.g., operating as explained above. Further, participating in the D2D communication may involve that, during a DRX active time, the wireless communication device sends at least one D2D transmission to at least one of the one or more further wireless communication devices. The wireless communication device may thus correspond as an TX UE, e.g., operating as explained above.

In some scenarios, step 740 may involve that processing of one or more D2D transmissions by the wireless communication device depends on a first DRX active time triggered by the first DRX configuration and/or a second DRX active time triggered by the second DRX configuration associated with the specific D2D communication class. The processing can be related to sending of a D2D transmission or to receiving of a D2D transmission. In some cases the wireless communication device may process a D2D transmission of the specific D2D communication class during the first DRX active time or the second DRX active time. In some cases the wireless communication device may process a D2D transmission of the specific D2D communication class only during the second DRX active time. In some cases the wireless communication device may process only a limited number of D2D transmissions of the specific D2D communication class during the first DRX active time. In some cases the wireless communication device may decide, depending on a congestion level in the first DRX active time, whether to process a D2D transmission of the specific D2D communication class in the first DRX active time. In some cases the wireless communication device may decide, depending on a congestion level in the second DRX active time, whether to process a D2D transmission of a D2D communication class different from the specific D2D communication class in the first DRX active time. In some cases, during the second DRX active time, the wireless communication device may process a D2D transmission of the specific D2D communication class with higher priority than a D2D transmission of another D2D communication class.

Figure 8:
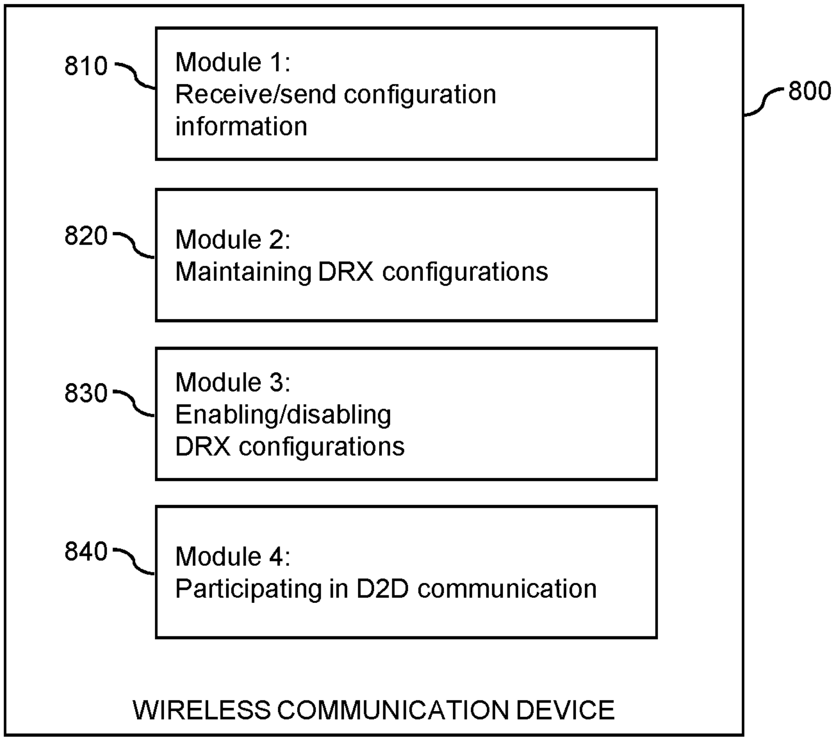
FIG. 8 shows an exemplary block diagram for illustrating functionalities of a wireless communication device implementing functionalities corresponding to the method of FIG. 7.

FIG. 8 shows a block diagram for illustrating functionalities of a wireless communication device 900 which operates according to the method of FIG. 7. The wireless communication device 800 may for example correspond to any of the above-mentioned UEs. As illustrated, the wireless communication device 800 may be provided with a module 810 configured to receive and/or send configuration information, such as explained in connection with step 710. Further, the wireless communication device 800 device may be provided with a module 820 configured to simultaneously maintain multiple DRX configurations, such as explained in connection with step 720. Further, the wireless communication device 800 may optionally be provided with a module 830 configured to select whether to enable and/or disable at least one of the DRX configurations, such as explained in connection with step 730. Further, the wireless communication device 800 may be provided with a module 840 configured to participate in D2D communication, such as explained in connection with step 740.

It is noted that the wireless communication device 800 may include further modules for implementing other functionalities, such as known functionalities of a UE in the LTE and/or NR radio technology. Further, it is noted that the modules of the wireless communication device 800 do not necessarily represent a hardware structure of the wireless communication device 800, but may also correspond to functional elements, e.g., implemented by hardware, software, or a combination thereof.

Figure 9:
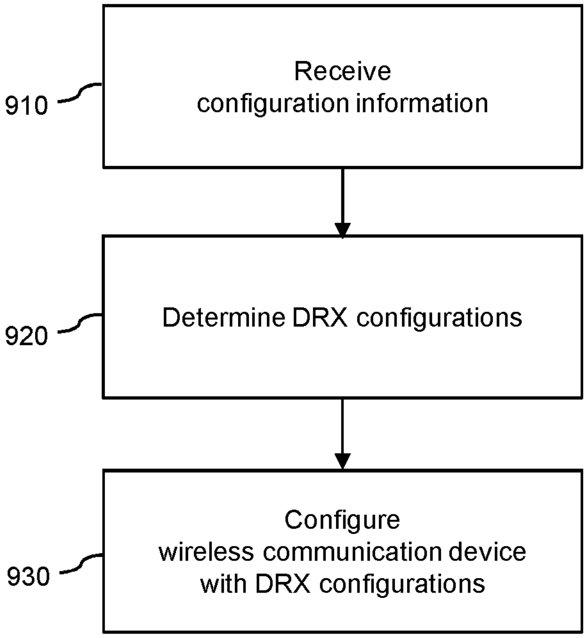
FIG. 9 shows a flowchart for schematically illustrating a further method according to an embodiment of the invention.

FIG. 9 shows a flowchart for illustrating a method, which may be utilized for implementing the illustrated concepts. The method of FIG. 9 may be used for implementing the illustrated concepts in a node of a wireless communication network, e.g., corresponding to the above-mentioned access node 100.

If a processor-based implementation of the node is used, at least some of the steps of the method of FIG. 9 may be performed and/or controlled by one or more processors of the node. Such node may also include a memory storing program code for implementing at least some of the below described functionalities or steps of the method of FIG. 9.

At step 910, the node may receive and/or send configuration information. For example, the node may receive configuration information from one or more wireless communication devices. Further, the node may send configuration information to one or more wireless communication devices. Further, the node may receive configuration information from one or more other nodes of a wireless communication network, such as another access node or control node. Further, the node may send configuration information to one or more other nodes of a wireless communication network, such as another access node or control node.

At step 920, the node may determine one or more DRX configurations for D2D communication. The DRX configurations each have the purpose of being used for D2D communication between a wireless communication device and one or more further wireless communication devices. In particular, the node may determine a first DRX communication for D2D communication of a wireless communication device with one or more further wireless communication devices and a second DRX configuration for D2D communication of the wireless communication device with one or more further wireless communication devices. The D2D communication may for example correspond to SL communication, e.g., via the PC5 interface of the LTE technology or the PC5 interface of the NR technology. The DRX configurations may thus correspond to SL DRX configurations. The DRX configurations may each be based on one or more timers for controlling transitions between a respective DRX active time and a respective DRX inactive time.

In some scenarios, the node may determine at least one of the DRX configurations based on configuration information received from one or more wireless communication devices, e.g., as received at step 910.

In some scenarios, the node may determine at least one of the DRX configurations based on configuration information received from another node of the wireless communication network, e.g., as received at step 910.

In some scenarios, the node may determine at least one of the DRX configurations based on congestion of radio resources to be used in the D2D communication, e.g., by using a congestion metric as a basis for selecting among a plurality of predefined DRX configurations.

In some scenarios, the node may determine at least one of the DRX configurations based on DRX configurations used by other wireless communication devices. Information on such DRX configurations used by other wireless communication devices could be indicated by configuration information as received at step 910.

In some scenarios, the node may determine at least one of the DRX configurations based on selection among a plurality of pre-defined DRX configurations. The selection among the plurality of pre-defined DRX configurations may at least in part be based on random selection.

In some scenarios, the node may determine configuration information for the determined DRX configuration(s) and indicate the determined configuration information to the wireless communication device.

In some scenarios, DRX configurations determined at step 920 may include a first DRX configuration which applies to a plurality of D2D communication classes and a second DRX configuration that applies to a specific D2D communication class. The plurality of D2D communication classes may or may not include the specific D2D communication class. The above-mentioned C-DRX configuration is an example of the first DRX configuration. The above-mentioned S-DRC configurations are examples of the second DRX configuration. The D2D communication classes may for example correspond to the above-mentioned classed of SL communication or classes of data packets conveyed by SL transmissions.

The D2D communication classes may be defined on the basis of identifiers of wireless communication devices participating in the D2D communication, e.g., L1 identifiers or L2 identifiers, and/or addresses of wireless communication devices participating in the D2D communication, e.g., L1 addresses or L2 addresses. Alternatively or in addition, the D2D communication classes may be defined on the basis of identifiers of D2D communication links used in the D2D communication. Alternatively or in addition, the D2D communication classes may be defined on the basis of whether the D2D communication is based on a unicast transmission mode. Alternatively or in addition, the D2D communication classes may be defined on the basis of whether the D2D communication is based on a groupcast transmission mode. Alternatively or in addition, the D2D communication classes may be defined on the basis of whether the D2D communication is based on a broadcast transmission mode. Alternatively or in addition, the D2D communication classes may be defined on the basis of one or more service types using the D2D communication. Alternatively or in addition, the D2D communication classes may be defined on the basis of locations of wireless communication devices participating in the D2D communication. Alternatively or in addition, the D2D communication classes may be defined on the basis of one or more Quality of Service attributes used in the D2D communication. Alternatively or in addition, the D2D communication classes may be defined on the basis of data traffic characteristics of the D2D communication, e.g., considering a periodicity or other patterns of data packet arrival.

At step 930, the node configures a wireless communication device to simultaneously maintain a first DRX configuration for D2D communication and a second DRX configuration for D2D communication. The first DRX configuration and the second DRX configuration each have the purpose of being used for D2D communication between the wireless communication device and one or more further wireless communication devices. The D2D communication may for example correspond to SL communication, e.g., via the PC5 interface of the LTE technology or the PC5 interface of the NR technology. The first DRX configuration and the second DRX configuration may thus correspond to SL DRX configurations. The first DRX configuration and the second DRX configuration may each be based on one or more timers for controlling transitions between a respective DRX active time and a respective DRX inactive time. The first DRX configuration and the second DRX configuration may correspond to the first DRX configuration and the second DRX configuration which may have been determined at step 920.

The first DRX configuration may apply to a plurality of D2D communication classes and the second DRX configuration may apply to a specific D2D communication class. The plurality of D2D communication classes may or may not include the specific D2D communication class. The above-mentioned C-DRX configuration is an example of the first DRX configuration. The above-mentioned S-DRC configurations are examples of the second DRX configuration. The D2D communication classes may for example correspond to the above-mentioned classed of SL communication or classes of data packets conveyed by SL transmissions.

The D2D communication classes may be defined on the basis of identifiers of wireless communication devices participating in the D2D communication, e.g., L1 identifiers or L2 identifiers, and/or addresses of wireless communication devices participating in the D2D communication, e.g., L1 addresses or L2 addresses. Alternatively or in addition, the D2D communication classes may be defined on the basis of identifiers of D2D communication links used in the D2D communication. Alternatively or in addition, the D2D communication classes may be defined on the basis of whether the D2D communication is based on a unicast transmission mode. Alternatively or in addition, the D2D communication classes may be defined on the basis of whether the D2D communication is based on a groupcast transmission mode. Alternatively or in addition, the D2D communication classes may be defined on the basis of whether the D2D communication is based on a broadcast transmission mode. Alternatively or in addition, the D2D communication classes may be defined on the basis of one or more service types using the D2D communication. Alternatively or in addition, the D2D communication classes may be defined on the basis of locations of wireless communication devices participating in the D2D communication. Alternatively or in addition, the D2D communication classes may be defined on the basis of one or more Quality of Service attributes used in the D2D communication. Alternatively or in addition, the D2D communication classes may be defined on the basis of data traffic characteristics of the D2D communication, e.g., considering a periodicity or other patterns of data packet arrival.

Further, the node may configure the wireless communication device with respect to selecting whether to enable the first DRX configuration and/or the second DRX configuration. The node may configure the wireless communication device to perform the selection, at least in part, based on the D2D communication with the one or more further wireless communication devices. Alternatively or in addition, the node may configure the wireless communication device to perform the selection, at least in part, based on congestion of radio resources to be used in the D2D communication, e.g., on a congestion metric. Alternatively or in addition, the node may configure the wireless communication device to perform the selection, at least in part, based on random selection. Alternatively or in addition, the node may configure the wireless communication device to perform the selection, at least in part, based on information received from at least one of the one or more further wireless communication devices. Alternatively or in addition, the node may configure the wireless communication device to perform the selection, at least in part, based on information received from a node of a wireless communication network.

As mentioned above, in some scenarios the first DRX configuration applies to a plurality of D2D communication classes and the second DRX configuration applies to a specific D2D communication class. In some cases this plurality of D2D communication classes may include the specific D2D communication class.

In some scenarios, the node may configure the wireless communication device to simultaneously maintain the first DRX configuration for D2D communication and a multiple second DRX configurations for D2D communication, with the second DRX configurations each applying to a different specific D2D communication class. For example, the wireless communication device could simultaneously maintain the above-mentioned C-DRC configuration and multiple of the above-mentioned S-DRX configurations.

In such case, the node may configure the wireless communication device to enable the second DRX configuration. The first D2D transmission may belong to the specific D2D communication class. Alternatively or in addition, the first D2D transmission may include a command to enable the second DRX configuration. For example, the first D2D transmission may convey a corresponding control message or corresponding control signalling. In some cases, the node may configure the wireless communication device to, in response to enabling the second DRX configuration, start a timer for controlling enablement of the second DRX configuration.

Further, the node may configure the wireless communication device to, in response to a second D2D transmission, disable the second DRX configuration. The second D2D transmission may include a command to disable the second DRX configuration. For example, the second D2D transmission may convey a corresponding control message or corresponding control signalling. In some cases, the node may configure the wireless communication device to disable the second DRX configuration in response to expiry of a timer. As mentioned above, the wireless communication device may be configured to start the timer in response to enabling the second DRX configuration. Further, the node may configure the wireless communication device to reset the timer in response to a D2D transmission of the specific D2D communication class. In some cases, the node may configure the wireless communication device to disable the second DRX configuration in response to releasing a D2D communication link used in the D2D communication of the specific class. In some cases, the node may configure the wireless communication device to disable the second DRX configuration in response to cease of D2D communication of the specific class.

In some scenarios, the node may configure the wireless communication device with respect to processing of one or more D2D transmissions by the wireless communication device depending on a first DRX active time triggered by the first DRX configuration and/or a second DRX active time triggered by the second DRX configuration associated with the specific D2D communication class. The processing can be related to sending of a D2D transmission or to receiving of a D2D transmission. In some cases the node may configure the wireless communication device to process a D2D transmission of the specific D2D communication class during the first DRX active time or the second DRX active time. In some cases the node may configure the wireless communication device to process a D2D transmission of the specific D2D communication class only during the second DRX active time. In some cases, the node may configure the wireless communication device to process only a limited number of D2D transmissions of the specific D2D communication class during the first DRX active time. In some cases, the node may configure the wireless communication device to decide, depending on a congestion level in the first DRX active time, whether to process a D2D transmission of the specific D2D communication class in the first DRX active time. In some cases, the node may configure the wireless communication device to decide, depending on a congestion level in the second DRX active time, whether to process a D2D transmission of a D2D communication class different from the specific D2D communication class in the first DRX active time. In some cases, the node may configure the wireless communication device to, during the second DRX active time, process a D2D transmission of the specific D2D communication class with higher priority than a D2D transmission of another D2D communication class.

Figure 10:
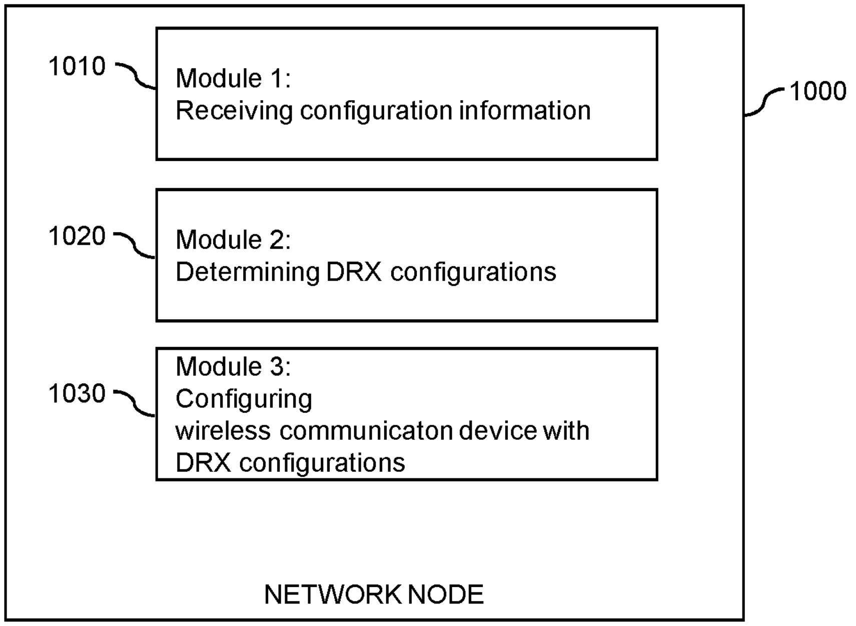
FIG. 10 shows an exemplary block diagram for illustrating functionalities of a network node implementing functionalities corresponding to the method of FIG. 9.

FIG. 10 shows a block diagram for illustrating functionalities of node 1000 for a wireless communication network which operates according to the method of FIG. 9. The node 1000 may for example correspond to any of the above-mentioned access nodes. As illustrated, the node 1000 may be provided with a module 1010 configured to receive configuration information, such as explained in connection with step 910. Further, the node 1000 may be provided with a module 1020 configured to determine DRX configurations for D2D communication, such as explained in connection with step 920. Further, the node 1000 may be provided with a module 930 configured to configure a wireless communication devices to simultaneously maintain multiple DRX configurations for D2D communication, such as explained in connection with step 930.

It is noted that the node 1000 may include further modules for implementing other functionalities, such as known functionalities of a eNB in the LTE technology and/or a gNB in the NR technology. Further, it is noted that the modules of the node 1000 do not necessarily represent a hardware structure of the node 1000, but may also correspond to functional elements, e.g., implemented by hardware, software, or a combination thereof.

It is to be understood that the functionalities as described in connection with FIGS. 7 to 10 may also be combined in various ways, e.g., in a system which includes two or more wireless communication devices operating according to the method of FIG. 7 or in a system which includes one or more wireless communication devices operating according to the method of FIG. 7 and a node operating according to the method of FIG. 9. Further, the same wireless communication device could implement functionalities corresponding to an RX UE and functionalities corresponding to a TX UE.

Figure 11:
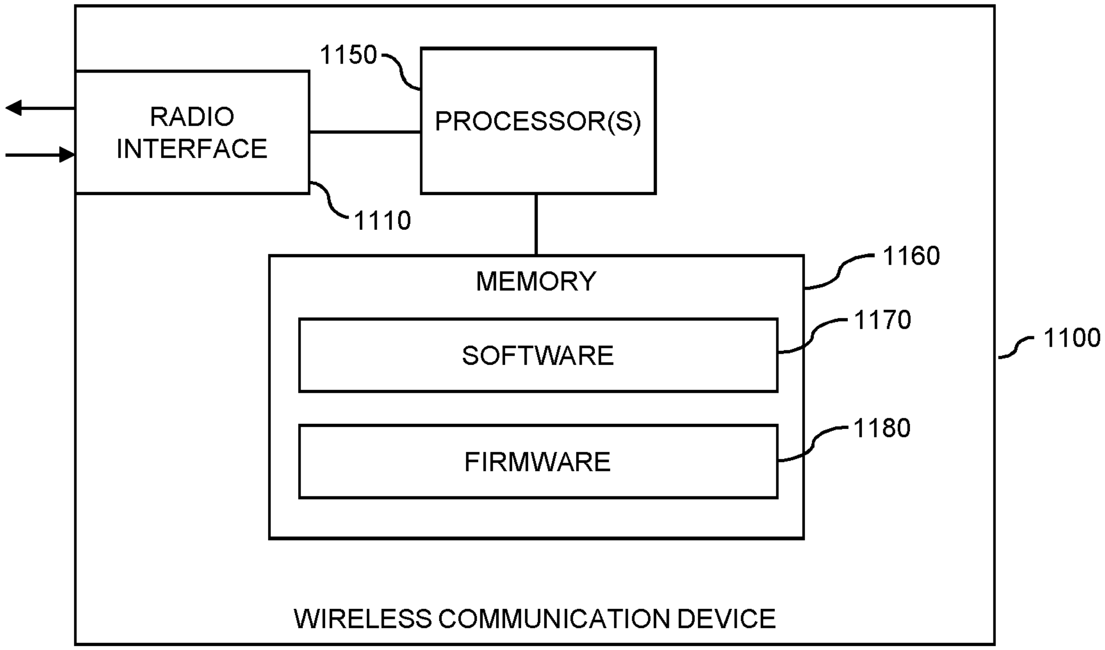
FIG. 11 schematically illustrates structures of a wireless communication device according to an embodiment of the invention.

FIG. 11 illustrates a processor-based implementation of a wireless communication device 1100 which may be used for implementing the above-described concepts. For example, the structures as illustrated in FIG. 11 may be used for implementing the concepts in any of the above-mentioned UEs.

As illustrated, the wireless communication device 1100 includes one or more radio interfaces 1110. The radio interface(s) 1110 may for example be based on the NR technology or the LTE technology. The radio interface(s) 1110 may support D2D communication, e.g., using SL communication as specified for the NR technology or the LTE technology.

Further, the wireless communication device 1100 may include one or more processors 1150 coupled to the radio interface(s) 1110 and a memory 1160 coupled to the processor(s) 1150. By way of example, the radio interface(s) 1110, the processor(s) 1150, and the memory 1160 could be coupled by one or more internal bus systems of the wireless communication device 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling D2D communication, such as explained in connection with FIG. 7 or 8.

It is to be understood that the structures as illustrated in FIG. 11 are merely schematic and that the wireless communication device 1100 may actually include further components which, for the sake of clarity, have not been illustrated, e.g., further interfaces, such as a dedicated management interface, or further processors. Also, it is to be understood that the memory 1160 may include further program code for implementing known functionalities of a UE. According to some embodiments, also a computer program may be provided for implementing functionalities of the wireless communication device 1100, e.g., in the form of a physical medium storing the program code and/or other data to be stored in the memory 1160 or by making the program code available for download or by streaming.

Figure 12:
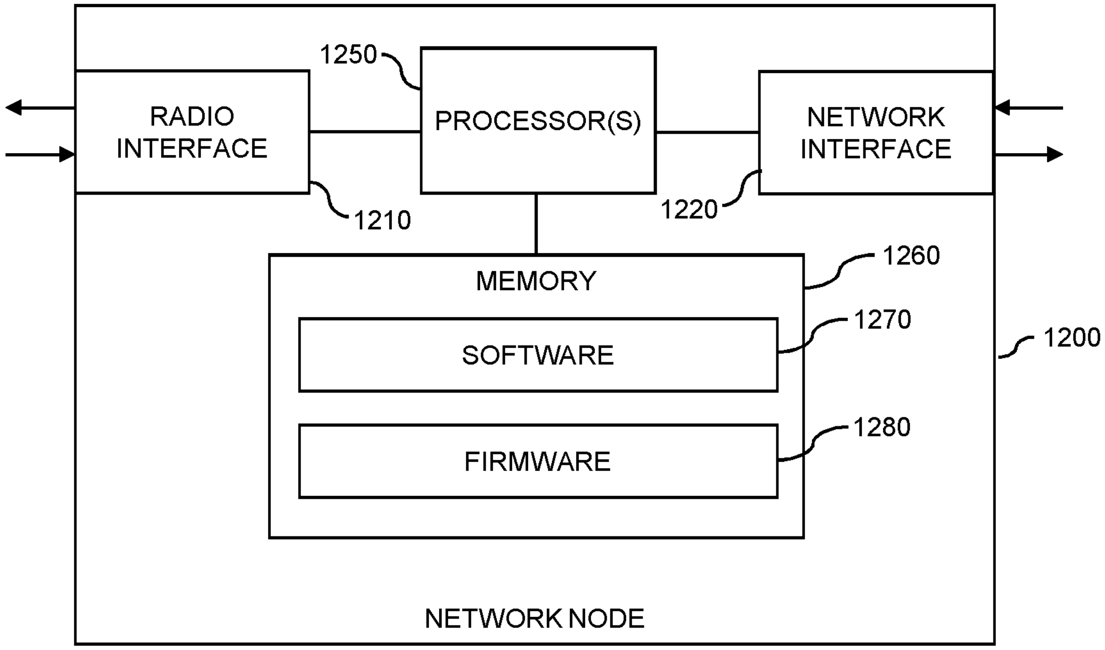
FIG. 12 schematically illustrates structures of a network node according to an embodiment of the invention.

FIG. 12 illustrates a processor-based implementation of a node 1200 for a wireless communication network, which may be used for implementing the above-described concepts. For example, the structures as illustrated in FIG. 12 may be used for implementing the concepts in any of the above-mentioned access nodes.

As illustrated, the node 1200 may include one or more radio interfaces 1210. The radio interface(s) 1210 may for example be based on the NR technology or the LTE technology. The radio interface(s) 1210 may be used for controlling wireless communication devices, such as any of the above-mentioned UEs. In addition, the node 1200 may include one or more network interfaces 1220. The network interface(s) 1220 may for example be used for communication with one or more other nodes of the wireless communication network. Also the network interface(s) 1220 may be used for controlling wireless communication devices, such as any of the above-mentioned UEs.

Further, the node 1200 may include one or more processors 1250 coupled to the interface(s) 1210, 1220 and a memory 1260 coupled to the processor(s) 1250. By way of example, the interface(s) 1210, the processor(s) 1250, and the memory 1260 could be coupled by one or more internal bus systems of the node 1200. The memory 1260 may include a ROM, e.g., a flash ROM, a RAM, e.g., a DRAM or SRAM, a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling D2D communication, such as explained in connection with FIGS. 9 and 10.

It is to be understood that the structures as illustrated in FIG. 12 are merely schematic and that the wireless communication device 1200 may actually include further components which, for the sake of clarity, have not been illustrated, e.g., further interfaces, such as a dedicated management interface, or further processors. Also, it is to be understood that the memory 1260 may include further program code for implementing known functionalities of an eNB or of a gNB. According to some embodiments, also a computer program may be provided for implementing functionalities of the node 1200, e.g., in the form of a physical medium storing the program code and/or other data to be stored in the memory 1260 or by making the program code available for download or by streaming.

As can be seen, the concepts as described above may be used for performing D2D communication in an energy efficient manner. In particular, the concepts may be used for applying DRX to SL or other types of D2D communication, without requiring any hierarchy of the involved devices. Further, the concepts may be used for enabling DRX for D2D communication not only in unicast mode, but also in groupcast mode, or broadcast mode, or any combination of unicast mode, groupcast mode, and broadcast mode. Further, different SL DRX configurations can be provided, depending on the needs of each UE.

It is to be understood that the examples and embodiments as explained above are merely illustrative and susceptible to various modifications. For example, the illustrated concepts may be applied in connection with various kinds of radio technologies and D2D communication, without limitation the SL mode of the LTE technology or NR technology, e.g., in connection with WLAN technologies or other wireless ad-hoc network technologies. Further, the concepts may be applied with respect to various types of UEs, without limitation to vehicle-based UEs. Further, the concepts may be applied in connection with various services supported by D2D communication, without limitation to V2X, NSPS, or NCIS. Further, the aspects of the illustrated concepts which relate to determination and providing of DRX configurations for D2D communication could also be used independently from the aspects related to simultaneous configuration of multiple DRX configurations for D2D communication. Further, it is noted that in some scenarios one or more of the class specific DRX configurations could be used independently of a generic DRX configuration. For example, a UE could be configured with one or more of the S-DRX configurations, but no C-DRX configuration. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In View of the Above, Embodiments Provided by the Present Disclosure Include:

Embodiment 1:

A method of controlling device-to-device, D2D, communication, the method comprising:

a wireless communication device (10; 800; 1100) simultaneously maintaining a first Discontinuous Reception, DRX, configuration for D2D communication and a second DRX configuration for D2D communication; and based on at least one of the first DRX configuration and the second DRX configuration, the wireless communication device (10; 800; 1100) participating in D2D communication with one or more further wireless communication devices (10; 800; 1100).

Embodiment 2:

The method according to embodiment 1, comprising:

the wireless communication device (10; 800; 1100) selecting whether to enable the first DRX configuration and/or the second DRX configuration.

Embodiment 3:

The method according to embodiment 2, wherein said selecting whether to enable the first DRX configuration and/or the second DRX configuration is based at least in part on the D2D communication with the one or more further wireless communication devices (10; 800; 1100).

Embodiment 4:

The method according to embodiment 2 or 3, wherein said selecting whether to enable the first DRX configuration and/or the second DRX configuration is based at least in part on congestion of radio resources to be used in the D2D communication.

Embodiment 5:

The method according to any one of embodiments 2 to 4, wherein said selecting whether to enable the first DRX configuration and/or the second DRX configuration is based at least in part on random selection.

Embodiment 6:

The method according to any one of embodiments 2 to 5, wherein said selecting whether to enable the first DRX configuration and/or the second DRX configuration is based at least in part on information received from at least one of the one or more further wireless communication devices (10; 800; 1100).

Embodiment 7:

The method according to any one of embodiments 2 to 6, wherein said selecting whether to enable the first DRX configuration and/or the second DRX configuration is based at least in part on information received from a node (100; 1000; 1200) of a wireless communication network.

Embodiment 8:

The method according to any one of embodiments 2 to 7, comprising:

the wireless communication device (10; 800; 1100) indicating the selected at least one of the first DRX configuration and/or the second DRX configuration to at least one of the one or more further wireless communication devices (10; 800; 1100).

Embodiment 9:

The method according to any one of embodiments 1 to 8, wherein the first DRX configuration applies to a plurality of D2D communication classes and the second DRX configuration applies to a specific D2D communication class.

Embodiment 10:

The method according to embodiment 9, wherein the plurality of D2D communication classes comprises the specific D2D communication class.

Embodiment 11:

The method according to embodiment 9 or 10, comprising:

in response to a first D2D transmission, the wireless communication device enabling the second DRX configuration.

Embodiment 12:

The method according to embodiment 11, wherein the first D2D transmission belongs to the specific D2D communication class.

Embodiment 13:

The method according to embodiment 11 or 12, wherein the first D2D transmission comprises a command to enable the second DRX configuration.

Embodiment 14:

The method according to any one of embodiments 9 to 13, comprising:

in response to enabling the second DRX configuration, the wireless communication device (10; 800; 1100) starting a timer for controlling enablement of the second DRX configuration.

Embodiment 15:

The method according to any one of embodiments 9 to 14, comprising:

in response to a second D2D transmission, the wireless communication device (10; 800; 1100) disabling the second DRX configuration.

Embodiment 16:

The method according to embodiment 15, wherein the second D2D transmission comprises a command to disable the second DRX configuration.

Embodiment 17:

The method according to any one of embodiments 9 to 16, comprising:

the wireless communication device (10; 800; 1100) disabling the second DRX configuration in response to expiry of a timer.

Embodiment 18:

The method according to embodiment 17, comprising:

the wireless communication device (10; 800; 1100) starting the timer in response to enabling the second DRX configuration.

Embodiment 19:

The method according to embodiment 17 or 18, comprising:

the wireless communication device (10; 800; 1100) resetting the timer in response to a D2D transmission of the specific D2D communication class.

Embodiment 20:

The method according to any one of embodiments 9 to 19, comprising:

the wireless communication device (10; 800; 1100) disabling the second DRX configuration in response to releasing a D2D communication link used in the D2D communication of the specific class.

Embodiment 21:

The method according to any one of embodiments 9 to 20, comprising:

the wireless communication device (10; 800; 1100) disabling the second DRX configuration in response to cease of D2D communication of the specific class.

Embodiment 22:

The method according to any one of embodiments 9 to 21, wherein the D2D communication classes are defined on the basis of identifiers of wireless communication devices (10; 800; 1100) participating in the D2D communication and/or addresses of wireless communication devices (10; 800; 1100) participating in the D2D communication.

Embodiment 23:

The method according to any one of embodiments 9 to 22, wherein the D2D communication classes are defined on the basis of identifiers of D2D communication links used in the D2D communication.

Embodiment 24:

The method according to any one of the embodiments 9 to 23, wherein the D2D communication classes are defined on the basis of whether the D2D communication is based on a unicast transmission mode.

Embodiment 25:

The method according to any one of embodiments 9 to 24, wherein the D2D communication classes are defined on the basis of whether the D2D communication is based on a groupcast transmission mode.

Embodiment 26:

The method according to any one of embodiments 9 to 25, wherein the D2D communication classes are defined on the basis of whether the D2D communication is based on a broadcast transmission mode.

Embodiment 27:

The method according to any one of embodiments 9 to 26, wherein the D2D communication classes are defined on the basis of one or more service types using the D2D communication.

Embodiment 28:

The method according to any one of embodiments 9 to 27, wherein the D2D communication classes are defined on the basis of locations of wireless communication devices participating in the D2D communication.

Embodiment 29:

The method according to any one of embodiments 9 to 28, wherein the D2D communication classes are defined on the basis of one or more Quality of Service attributes used in the D2D communication.

Embodiment 30:

The method according to any one of embodiments 9 to 29, wherein the D2D communication classes are defined on the basis of data traffic characteristics of the D2D communication.

Embodiment 31:

The method according to any one of embodiments 9 to 30, comprising:

the wireless communication device (10; 800; 1100) simultaneously maintaining the first DRX configuration for D2D communication and a multiple second DRX configurations for D2D communication, wherein the second DRX configurations each apply to a different specific D2D communication class.

Embodiment 32:

The method according to any one of embodiments 9 to 31, wherein processing of one or more D2D transmissions by the wireless communication device (10; 800; 1100) depends on a first DRX active time triggered by the first DRX configuration and/or a second DRX active time triggered by the second DRX configuration associated with the specific D2D communication class.

Embodiment 33:

The method according to embodiment 32, comprising:

the wireless communication device (10; 800; 1100) processing a D2D transmission of the specific D2D communication class during the first DRX active time or the second DRX active time.

Embodiment 34:

The method according to embodiment 32, comprising:

the wireless communication device (10; 800; 1100) processing a D2D transmission of the specific D2D communication class only during the second DRX active time.

Embodiment 35:

The method according to embodiment 32 or 33, comprising:

the wireless communication device (10; 800; 1100) processing only a limited number of D2D transmissions of the specific D2D communication class during the first DRX active time.

Embodiment 36:

The method according to embodiment 32 or 33 or 35, comprising:

depending on a congestion level in the first DRX active time, the wireless communication device (10; 800; 1100) deciding whether to process a D2D transmission of the specific D2D communication class in the first DRX active time.

Embodiment 37:

The method according to any one of embodiments 32 to 36, comprising:

depending on a congestion level in the second DRX active time, the wireless communication device (10; 800; 1100) deciding whether to process a D2D transmission of a D2D communication class different from the specific D2D communication class in the first DRX active time.

Embodiment 38:

The method according to any one of embodiments 32 to 37, comprising:

during the second DRX active time, the wireless communication device processing a D2D transmission of the specific D2D communication class with higher priority than a D2D transmission of another D2D communication class.

Embodiment 38:

The method according to any one of embodiments 1 to 37, wherein said participating in the D2D communication comprises:

during a DRX active time, the wireless communication device (10; 800; 1100) receiving at least one D2D transmission from at least one of the one or more further wireless communication devices (10; 800; 1100).

Embodiment 39:

The method according to any one of embodiments 1 to 38, wherein said participating in the D2D communication comprises:

during a DRX active time, the wireless communication device (10; 800; 1100) sending at least one D2D transmission to at least one of the one or more further wireless communication devices (10; 800; 1100).

Embodiment 40:

The method according to any one of embodiments 1 to 39, comprising:

the wireless communication device (10; 800; 1100) determining at least one of the first DRX configuration and the second DRX configuration based on configuration information received from at least one of the one or more further wireless communication devices (10; 800; 1100).

Embodiment 41:

The method according to any one of embodiments 1 to 40, comprising:

the wireless communication device (10; 800; 1100) determining at least one of the first DRX configuration and the second DRX configuration based on configuration information received from a node (100; 1000; 1200) of the wireless communication network.

Embodiment 42:

The method according to any one of embodiments 1 to 41, comprising:

the wireless communication device (10; 800; 1100) determining at least one of the first DRX configuration and the second DRX configuration based on congestion of radio resources to be used in the D2D communication.

Embodiment 43:

The method according to any one of embodiments 1 to 42, comprising:

the wireless communication device (10; 800; 1100) determining at least one of the first DRX configuration and the second DRX configuration based on DRX configurations used by other wireless communication devices (10; 800; 1100).

Embodiment 44:

The method according to any one of embodiments 1 to 43, comprising:

the wireless communication device (10; 800; 1100) determining at least one of the first DRX configuration and the second DRX configuration based on selection among a plurality of pre-defined DRX configurations.

Embodiment 45:

The method according to embodiment 44, wherein the selection among the plurality of pre-defined DRX configurations is at least in part based on random selection.

Embodiment 46:

The method according to any one of embodiments 1 to 45, comprising:

the wireless communication device (10; 800; 1100) determining configuration information for at least one of the first DRX configuration and the second DRX configuration; and the wireless communication device (10; 800; 1100) indicating the determined configuration information to at least one of the one or more further wireless communication devices.

Embodiment 47:

A method of controlling D2D communication in a wireless communication network, the method comprising:

a node (100; 1000; 1200) of the wireless communication network configuring a wireless communication device (10; 800; 1100) to simultaneously maintain a first Discontinuous Reception, DRX, configuration for D2D communication with one or more further wireless communication devices (10; 800; 1100) and a second DRX configuration for D2D communication with one or more further wireless communication devices (10; 800; 1100).

Embodiment 48:

The method according to embodiment 47, wherein the first DRX configuration applies to a plurality of D2D communication classes and the second DRX configuration applies to a specific D2D communication class.

Embodiment 49:

The method according to embodiment 48, wherein the plurality of D2D communication classes comprises the specific D2D communication class.

Embodiment 50:

The method according to embodiment 48 or 49, comprising:

the node (100; 1000; 1200) configuring the wireless communication device (10; 800; 1100) to enable the second DRX configuration in response to a first D2D transmission.

Embodiment 51:

The method according to embodiment 50, wherein the first D2D transmission belongs to the specific D2D communication class.

Embodiment 52:

The method according to embodiment 50 or 51, wherein the first D2D transmission comprises a command to enable the second DRX configuration.

Embodiment 53:

The method according to any one of embodiments 48 to 52, comprising:

the node (100; 1000; 1200) configuring the wireless communication device (10; 800; 1100) to, in response to enabling the second DRX configuration, start a timer for controlling enablement of the second DRX configuration.

Embodiment 54:

The method according to any one of embodiments 48 to 53, comprising:

the node (100; 1000; 1200) configuring the wireless communication device (10; 800; 1100) to, in response to a second D2D transmission, disable the second DRX configuration.

Embodiment 55:

The method according to embodiment 54, wherein the second D2D transmission comprises a command to disable the second DRX configuration.

Embodiment 56:

The method according to any one of embodiments 48 to 55, comprising:

the node (100; 1000; 1200) configuring the wireless communication device (10; 800; 1100) to disable the second DRX configuration in response to expiry of a timer.

Embodiment 57:

The method according to embodiment 56, comprising:

the node (100; 1000; 1200) configuring the wireless communication device (10; 800; 1100) to start the timer in response to enabling the second DRX configuration.

Embodiment 58:

The method according to embodiment 56 or 57, comprising:

the node (100; 1000; 1200) configuring the wireless communication device (10; 800; 1100) to reset the timer in response to a D2D transmission of the specific D2D communication class.

Embodiment 59:

The method according to any one of embodiments 48 to 58, comprising:

the node (100; 1000; 1200) configuring the wireless communication device (10; 800; 1100) to disable the second DRX configuration in response to releasing a D2D communication link used in the D2D communication of the specific class.

Embodiment 60:

The method according to any one of embodiments 48 to 59, comprising:

the node (100; 1000; 1200) configuring the wireless communication device (10; 800; 1100) to disable the second DRX configuration in response to cease of D2D communication of the specific class.

Embodiment 61:

The method according to any one of embodiments 48 to 60, wherein the D2D communication classes are defined on the basis of identifiers of wireless communication devices (10; 800; 1100) participating in the D2D communication and/or addresses of wireless communication devices (10; 800; 1100) participating in the D2D communication.

Embodiment 62:

The method according to any one of embodiments 48 to 61, wherein the D2D communication classes are defined on the basis of identifiers of D2D communication links used in the D2D communication.

Embodiment 63:

The method according to any one of the embodiments 48 to 62, wherein the D2D communication classes are defined on the basis of whether the D2D communication is based on a unicast transmission mode.

Embodiment 64:

The method according to any one of embodiments 48 to 63, wherein the D2D communication classes are defined on the basis of whether the D2D communication is based on a groupcast transmission mode.

Embodiment 65:

The method according to any one of embodiments 48 to 64, wherein the D2D communication classes are defined on the basis of whether the D2D communication is based on a broadcast transmission mode.

Embodiment 66:

The method according to any one of embodiments 48 to 65, wherein the D2D communication classes are defined on the basis of one or more service types using the D2D communication.

Embodiment 67:

The method according to any one of embodiments 48 to 66, wherein the D2D communication classes are defined on the basis of locations of wireless communication devices participating in the D2D communication.

Embodiment 68:

The method according to any one of embodiments 48 to 67, wherein the D2D communication classes are defined on the basis of one or more Quality of Service attributes used in the D2D communication.

Embodiment 69:

The method according to any one of embodiments 48 to 68, wherein the D2D communication classes are defined on the basis of data traffic characteristics of the D2D communication.

Embodiment 70:

The method according to any one of embodiments 48 to 69, comprising:

the node (100; 1000; 1200) configuring the wireless communication device (10; 800; 1100) to simultaneously maintain the first DRX configuration for D2D communication and a multiple second DRX configurations for D2D communication, wherein the second DRX configurations each apply to a different specific D2D communication class.

Embodiment 71:

The method according to any one of embodiments 48 to 70, wherein processing of one or more D2D transmissions by the wireless communication device (10; 800; 1100) depends on a first DRX active time triggered by the first DRX configuration and/or a second DRX active time triggered by the second DRX configuration associated with the specific D2D communication class.

Embodiment 72:

The method according to embodiment 71, comprising:

the node (100; 1000; 1200) configuring the wireless communication device (10; 800; 1100) to process a D2D transmission of the specific D2D communication class during the first DRX active time or the second DRX active time.

Embodiment 73:

The method according to embodiment 71, comprising:

the node (100; 1000; 1200) configuring the wireless communication device (10; 800; 1100) to process a D2D transmission of the specific D2D communication class only during the second DRX active time.

Embodiment 74:

The method according to embodiment 71 or 72, comprising:

the node (100; 1000; 1200) configuring the wireless communication device (10; 800; 1100) to process only a limited number of D2D transmissions of the specific D2D communication class during the first DRX active time.

Embodiment 75:

The method according to embodiment 71 or 72 or 74, comprising:

the node (100; 1000; 1200) configuring the wireless communication device (10; 800; 1100) to, depending on a congestion level in the first DRX active time, decide whether to process a D2D transmission of the specific D2D communication class in the first DRX active time.

Embodiment 76:

The method according to any one of embodiments 71 to 75, comprising:

the node (100; 1000; 1200) configuring the wireless communication device (10; 800; 1100) to, depending on a congestion level in the second DRX active time, decide whether to process a D2D transmission of a D2D communication class different from the specific D2D communication class in the first DRX active time.

Embodiment 77:

The method according to any one of embodiments 71 to 76, comprising:

the node (100; 1000; 1200) configuring the wireless communication device (10; 800; 1100) to, during the second DRX active time, process a D2D transmission of the specific D2D communication class with higher priority than a D2D transmission of another D2D communication class.

Embodiment 78:

The method according to any one of embodiments 47 to 77, comprising:

the node (100; 1000; 1200) determining at least one of the first DRX configuration and the second DRX configuration based on configuration information received from at least one of the one or more further wireless communication devices.

Embodiment 79:

The method according to any one of embodiments 47 to 78, comprising:

the node (100; 1000; 1200) determining at least one of the first DRX configuration and the second DRX configuration based on congestion of radio resources to be used in the D2D communication.

Embodiment 80:

The method according to any one of embodiments 47 to 79, comprising:

the node (100; 1000; 1200) determining at least one of the first DRX configuration and the second DRX configuration based on DRX configurations used by other wireless communication devices.

Embodiment 81:

The method according to any one of embodiments 47 to 80, comprising:

the node (100; 1000; 1200) determining at least one of the first DRX configuration and the second DRX configuration based on selection among a plurality of pre-defined DRX configurations.

Embodiment 82:

The method according to embodiment 81, wherein the selection among the plurality of pre-defined DRX configurations is at least in part based on random selection.

Embodiment 83:

A wireless communication device (10; 800; 1100), the wireless communication device (10; 800; 1100) being configured to:

simultaneously maintain a first Discontinuous Reception, DRX, configuration for D2D communication and a second DRX configuration for D2D communication; and based on at least one of the first DRX configuration and the second DRX configuration, participate in D2D communication with one or more further wireless communication devices.

Embodiment 84:

The wireless communication device (10; 800; 1100) according to embodiment 83, wherein the wireless communication device (10; 800; 1100) is configured to perform a method according to any one of embodiments 2 to 46.

Embodiment 85:

The wireless communication device (10; 800; 1100) according to embodiment 83 or 84, comprising:

at least one processor (1150), and a memory (1160) containing program code executable by the at least one processor (1150), whereby execution of the program code by the at least one processor (1150) causes the wireless communication device (10; 800; 1100) to perform a method according to any one of embodiments 1 to 46.

Embodiment 86:

A node (100; 1000; 1200) for a wireless communication network, the node (100; 1000; 1200) being configured to:

configure a wireless communication device (10; 800; 1100) to simultaneously maintain a first Discontinuous Reception, DRX, configuration for D2D communication with one or more further wireless communication devices (10; 800; 1100) and a second DRX configuration for D2D communication with one or more further wireless communication devices (10; 800; 1100).

Embodiment 87:

The node according to embodiment 86, wherein the node (100; 1000; 1200) is configured to perform a method according to any one of embodiments 48 to 82.

Embodiment 88:

The node (100; 1000; 1200) according to embodiment 86 or 87, comprising:

at least one processor (1250), and a memory (1260) containing program code executable by the at least one processor (1250), whereby execution of the program code by the at least one processor (1250) causes the node (100; 1000; 1200) to perform a method according to any one of embodiments 47 to 82.

Embodiment 89:

A computer program or computer program product comprising program code to be executed by at least one processor (1150) of a wireless communication device (10; 800; 1100), whereby execution of the program code causes the wireless communication device (10; 800; 1100) to perform a method according to any one of embodiments 1 to 46.

Embodiment 90:

A computer program or computer program product comprising program code to be executed by at least one processor of a node (100; 1000; 1200) for a wireless communication network, whereby execution of the program code causes the node (100; 1000; 1200) to perform a method according to any one of embodiments 47 to 82.

The invention claimed is:

1. A method of controlling device-to-device (D2D) communication, the method comprising:

a wireless communication device simultaneously maintaining a first Discontinuous Reception (DRX) configuration for D2D communication and a second DRX configuration for D2D communication, wherein the first DRX configuration applies to a plurality of D2D communication classes and the second DRX configuration applies to a specific D2D communication class, wherein D2D communication classes are defined on the basis of one or more Quality of Service attributes used in D2D communication;

in response to a first D2D transmission, the wireless communication device enabling the second DRX configuration, wherein the first D2D transmission belongs to the specific D2D communication class; and based on at least one of the first DRX configuration and the second DRX configuration, the wireless communication device participating in D2D communication with one or more further wireless communication devices.

2. The method according to claim 1, further comprising the wireless communication device selecting whether to enable the first DRX configuration and/or the second DRX configuration, wherein said selecting whether to enable the first DRX configuration and/or the second DRX configuration is based at least in part on:

the D2D communication with the one or more further wireless communication devices; and/or information received from at least one of the one or more further wireless communication devices; and/or information received from a node of a wireless communication network.

3. The method according to claim 2, further comprising the wireless communication device indicating the selected at least one of the first DRX configuration and/or the second DRX configuration to at least one of the one or more further wireless communication devices.

4. The method according to claim 1, wherein the plurality of D2D communication classes comprises the specific D2D communication class.

5. The method according to claim 1, comprising, in response to a second D2D transmission, the wireless communication device disabling the second DRX configuration.

6. The method according to claim 1, wherein the D2D communication classes are defined further on the basis of:

identifiers of wireless communication devices participating in the D2D communication; and/or addresses of wireless communication devices participating in the D2D communication; and/or identifiers of D2D communication links used in the D2D communication; and/or whether the D2D communication is based on a unicast transmission mode; and/or whether the D2D communication is based on a groupcast transmission mode; and/or whether the D2D communication is based on a broadcast transmission mode; and/or one or more service types using the D2D communication; and/or locations of wireless communication devices participating in the D2D communication; and/or data traffic characteristics of the D2D communication.

7. The method according to claim 1, comprising:

the wireless communication device simultaneously maintaining the first DRX configuration for D2D communication and multiple second DRX configurations for D2D communication, wherein the second DRX configurations each apply to a different specific D2D communication class.

8. The method according to claim 1, wherein processing of one or more D2D transmissions by the wireless communication device depends on a first DRX active time triggered by the first DRX configuration and/or a second DRX active time triggered by the second DRX configuration associated with the specific D2D communication class.

9. The method according to claim 8, further comprising:

depending on a congestion level in the first DRX active time, the wireless communication device deciding whether to process a D2D transmission of the specific D2D communication class in the first DRX active time; or depending on a congestion level in the second DRX active time, the wireless communication device deciding whether to process a D2D transmission of a D2D communication class different from the specific D2D communication class in the first DRX active time.

10. The method according to claim 1, further comprising the wireless communication device determining at least one of the first DRX configuration and the second DRX configuration based on:

configuration information received from at least one of the one or more further wireless communication devices; and/or configuration information received from a node of the wireless communication network; and/or DRX configurations used by other wireless communication devices; and/or selection among a plurality of pre-defined DRX configurations.

11. The method according to claim 1, further comprising:

the wireless communication device determining configuration information for at least one of the first DRX configuration and the second DRX configuration; and the wireless communication device indicating the determined configuration information to at least one of the one or more further wireless communication devices.

12. The method according to claim 1, wherein the wireless communication device is a connected vehicle.

13. A method of controlling D2D communication in a wireless communication network, the method comprising:

a node of the wireless communication network configuring a wireless communication device to simultaneously maintain a first Discontinuous Reception (DRX) configuration for D2D communication with one or more further wireless communication devices and a second DRX configuration for D2D communication with one or more further wireless communication devices, wherein the first DRX configuration applies to a plurality of D2D communication classes and the second DRX configuration applies to a specific D2D communication class, wherein D2D communication classes are defined on the basis of one or more Quality of Service attributes used in D2D communication; and the node configuring the wireless communication device to:

depending on a congestion level in the first DRX active time, decide whether to process a D2D transmission of the specific D2D communication class in the first DRX active time; or depending on a congestion level in the second DRX active time, decide whether to process a D2D transmission of a D2D communication class different from the specific D2D communication class in the first DRX active time.

14. The method according to claim 13, wherein the plurality of D2D communication classes comprises the specific D2D communication class.

15. The method according to claim 13, wherein the D2D communication classes are defined on the basis of:

identifiers of wireless communication devices participating in the D2D communication;

and/or addresses of wireless communication devices participating in the D2D communication;

and/or identifiers of D2D communication links used in the D2D communication; and/or whether the D2D communication is based on a unicast transmission mode; and/or whether the D2D communication is based on a groupcast transmission mode; and/or whether the D2D communication is based on a broadcast transmission mode; and/or one or more service types using the D2D communication; and/or locations of wireless communication devices participating in the D2D communication; and/or data traffic characteristics of the D2D communication.

16. The method according to claim 13, comprising:

the node configuring the wireless communication device to simultaneously maintain the first DRX configuration for D2D communication and multiple second DRX configurations for D2D communication, wherein the second DRX configurations each apply to a different specific D2D communication class.

17. The method according to claim 13, wherein processing of one or more D2D transmissions by the wireless communication device depends on a first DRX active time triggered by the first DRX configuration and/or a second DRX active time triggered by the second DRX configuration associated with the specific D2D communication class.

18. The method according to claim 13, further comprising the node determining at least one of the first DRX configuration and the second DRX configuration based on:

configuration information received from at least one of the one or more further wireless communication devices; and/or DRX configurations used by other wireless communication devices.

19. A wireless communication device comprising:

at least one processor; and a memory containing program code executable by the at least one processor whereby execution of the program code by the at least one processor causes the wireless communication device to:

simultaneously maintain a first Discontinuous Reception (DRX) configuration for D2D communication and a second DRX configuration for D2D communication, wherein the first DRX configuration applies to a plurality of D2D communication classes and the second DRX configuration applies to a specific D2D communication class, wherein D2D communication classes are defined on the basis of one or more Quality of Service attributes used in D2D communication;

in response to a first D2D transmission, enable the second DRX configuration, wherein the first D2D transmission belongs to the specific D2D communication class; and based on at least one of the first DRX configuration and the second DRX configuration, participate in D2D communication with one or more further wireless communication devices.

20. A node for a wireless communication network, the node comprising:

at least one processor; and a memory containing program code executable by the at least one processor whereby execution of the program code by the at least one processor causes the node to:

configure a wireless communication device to simultaneously maintain a first Discontinuous Reception (DRX) configuration for D2D communication with one or more further wireless communication devices and a second DRX configuration for D2D communication with one or more further wireless communication devices, wherein the first DRX configuration applies to a plurality of D2D communication classes and the second DRX configuration applies to a specific D2D communication class, wherein D2D communication classes are defined on the basis of one or more Quality of Service attributes used in D2D communication; and configure the wireless communication device to:

depending on a congestion level in the first DRX active time, decide whether to process a D2D transmission of the specific D2D communication class in the first DRX active time; or depending on a congestion level in the second DRX active time, decide whether to process a D2D transmission of a D2D communication class different from the specific D2D communication class in the first DRX active time.

21. A non-transitory computer-readable storage medium on which is stored program code to be executed by at least one processor of a wireless communication device for controlling device-to-device (D2D) communication, whereby execution of the program code causes the wireless communication device to:

simultaneously maintain a first Discontinuous Reception (DRX) configuration for D2D communication and a second DRX configuration for D2D communication, wherein the first DRX configuration applies to a plurality of D2D communication classes and the second DRX configuration applies to a specific D2D communication class, wherein D2D communication classes are defined on the basis of one or more Quality of Service attributes used in D2D communication;

in response to a first D2D transmission, enable the second DRX configuration, wherein the first D2D transmission belongs to the specific D2D communication class; and based on at least one of the first DRX configuration and the second DRX configuration, participate in D2D communication with one or more further wireless communication devices.

22. A non-transitory computer-readable storage medium on which is stored program code to be executed by at least one processor of a node for a wireless communication network for controlling D2D communication in the wireless communication network, whereby execution of the program code causes the node to:

configure a wireless communication device to simultaneously maintain a first Discontinuous Reception (DRX) configuration for D2D communication with one or more further wireless communication devices and a second DRX configuration for D2D communication with one or more further wireless communication devices, wherein the first DRX configuration applies to a plurality of D2D communication classes and the second DRX configuration applies to a specific D2D communication class, wherein D2D communication classes are defined on the basis of one or more Quality of Service attributes used in D2D communication; and configure the wireless communication device to:

depending on a congestion level in the first DRX active time, decide whether to process a D2D transmission of the specific D2D communication class in the first DRX active time; or depending on a congestion level in the second DRX active time, decide whether to process a D2D transmission of a D2D communication class different from the specific D2D communication class in the first DRX active time.

23. The method of claim 1, wherein the one or more Quality of Service attributes include one or more of an identity of a Quality of Service (QOS) flow, a QoS level, a QoS class, or a priority level of a data packet in D2D communication.

24. The method of claim 13, wherein the one or more Quality of Service attributes include one or more of an identity of a Quality of Service (QoS) flow, a QoS level, a QoS class, or a priority level of a data packet in D2D communication.

25. The wireless communication device of claim 19, wherein the one or more Quality of Service attributes include one or more of an identity of a Quality of Service (QoS) flow, a QoS level, a QoS class, or a priority level of a data packet in D2D communication.

26. The node of claim 20, wherein the one or more Quality of Service attributes include one or more of an identity of a Quality of Service (QOS) flow, a QoS level, a QoS class, or a priority level of a data packet in D2D communication.

* * * * *